(12) United States Patent
Bierschenk et al.

(10) Patent No.: US 9,840,346 B2
(45) Date of Patent: Dec. 12, 2017

(54) METHOD AND APPARATUS FOR MAKING A STRUCTURALLY RESILIENT PACKAGE

(71) Applicants: Frito-Lay North America, Inc., Plano, TX (US); Douglas Machine Inc., Alexandria, MN (US)

(72) Inventors: Patrick Joseph Bierschenk, Dallas, TX (US); Frank Mathew Brenkus, McKinney, TX (US); Ronald M. Gust, Miltona, MN (US); Steven Kenneth Tucker, Dallas, TX (US)

(73) Assignees: Frito-Lay North America, Inc., Plano, TX (US); Douglas Machine Inc., Alexandria, MN (US)

( * ) Notice: Subject to any disclaimer, the term of this patent is extended or adjusted under 35 U.S.C. 154(b) by 527 days.

(21) Appl. No.: 14/528,692

(22) Filed: Oct. 30, 2014

(65) Prior Publication Data
US 2015/0121813 A1 May 7, 2015

Related U.S. Application Data

(60) Provisional application No. 61/898,593, filed on Nov. 1, 2013, provisional application No. 61/898,626, filed
(Continued)

(51) Int. Cl.
*B65B 9/20* (2012.01)
*B65B 61/28* (2006.01)
(Continued)

(52) U.S. Cl.
CPC ............ *B65B 9/2056* (2013.01); *B29C 65/18* (2013.01); *B29C 65/745* (2013.01);
(Continued)

(58) Field of Classification Search
CPC ... B65B 9/2042; B65B 9/2049; B65B 9/2056; B65B 9/213; B65B 51/32; B65B 61/24; B65B 61/28; B65B 2220/24; B65B 51/303
(Continued)

(56) References Cited

U.S. PATENT DOCUMENTS 1,998,287 A    4/1935   Pierson et al.
3,263,391 A *   8/1966   Wallsten .................. B65B 9/12
                                                          493/194
(Continued)

FOREIGN PATENT DOCUMENTS

DE     2514120 A1 * 10/1976 ............ B29C 65/08
DE     2703455 A1 * 10/1977 ............ B65B 61/28
(Continued)

OTHER PUBLICATIONS

PCT International Search Report for PCT/US2014/063474 dated Feb. 19, 2015 (3 pages).

*Primary Examiner* — Stephen F Gerrity
(74) *Attorney, Agent, or Firm* — Brandon V. Zuniga; Colin P. Cahoon; Carstens & Cahoon, LLP

(57) ABSTRACT

A method and apparatus for making a structurally resilient package with a desired shape on a vertical form, fill, and seal machine. The method comprises sealing a film to form a back seal; forming a first end seal to form a partially formed first package; flattening a first side of the partially formed first package to form a flat first side; filling the partially formed first package with product; forming a second end seal on the partially formed first package to form a first package from the partially formed first package; flattening the second side of the first package to form a flat second side, wherein the flattening the first side and the flattening the second side occur on a first machine.

35 Claims, 22 Drawing Sheets

Related U.S. Application Data on Nov. 1, 2013, provisional application No. 62/072,093, filed on Oct. 29, 2014.

(51) Int. Cl.

| | | |
|---|---|---|
| *B65B 51/30* | (2006.01) | |
| *B65B 61/24* | (2006.01) | |
| *B65B 9/213* | (2012.01) | |
| *B29C 65/18* | (2006.01) | |
| *B29C 65/74* | (2006.01) | |
| *B29C 65/00* | (2006.01) | |
| *B29C 65/08* | (2006.01) | |

(52) U.S. Cl.
CPC ...... *B29C 66/1122* (2013.01); *B29C 66/4312* (2013.01); *B29C 66/81435* (2013.01); *B29C 66/8221* (2013.01); *B29C 66/83221* (2013.01); *B29C 66/849* (2013.01); *B65B 9/2042* (2013.01); *B65B 9/2049* (2013.01); *B65B 9/213* (2013.01); *B65B 51/303* (2013.01); *B65B 61/24* (2013.01); *B65B 61/28* (2013.01); *B29C 65/08* (2013.01); *B29C 66/4322* (2013.01); *B29C 66/71* (2013.01); *B29C 66/73711* (2013.01); *B29C 66/919* (2013.01); *B29C 66/91421* (2013.01); *B29C 66/91431* (2013.01); *B65B 2220/12* (2013.01)

(58) Field of Classification Search
USPC ...... 53/451, 551, 370.2, 370.6, 371.8, 372.2
See application file for complete search history.

(56) References Cited

U.S. PATENT DOCUMENTS

| | | | | |
|---|---|---|---|---|
| 3,347,015 | A * | 10/1967 | Nutting et al. | B65B 9/06 53/370.6 |
| 3,738,080 | A * | 6/1973 | Reil | B65B 9/13 53/551 |
| 3,857,223 | A | 12/1974 | Dominici | |
| 4,034,537 | A * | 7/1977 | Reil et al. | B65B 9/2049 53/141 |
| 4,079,572 | A | 3/1978 | Vande Castle | |
| 4,079,662 | A * | 3/1978 | Puccetti et al. | B65B 9/2014 493/203 |
| 4,080,237 | A | 3/1978 | Deimel | |
| 4,129,976 | A * | 12/1978 | Grundler et al. | B65B 9/2042 493/236 |
| 4,387,547 | A | 6/1983 | Reil | |
| 4,446,676 | A | 5/1984 | Grundler | |
| 4,462,202 | A | 7/1984 | Reil | |
| 4,485,613 | A * | 12/1984 | Saur | B65B 51/32 156/498 |
| 5,398,486 | A * | 3/1995 | Kauss et al. | B65B 9/2042 493/189 |
| 5,447,014 | A | 9/1995 | Adams et al. | |
| 5,473,866 | A | 12/1995 | Maglecic et al. | |
| 5,505,040 | A * | 4/1996 | Janssen et al. | B65B 9/2042 53/451 |
| 5,832,701 | A | 11/1998 | Hauers et al. | |
| 5,836,139 | A * | 11/1998 | Yoshida et al. | B65B 7/16 53/387.3 |
| 5,966,907 | A * | 10/1999 | Julius | B65B 51/30 53/370.6 |
| 6,343,459 | B1 * | 2/2002 | Seaward et al. | B65B 31/06 53/370.6 |
| 6,428,456 | B1 * | 8/2002 | Visona' et al. | B65B 9/2049 493/129 |
| 6,698,164 | B2 * | 3/2004 | Trani et al. | B31B 19/00 53/202 |
| 7,305,805 | B2 | 12/2007 | Dierl et al. | |
| D571,197 | S | 6/2008 | Sanfilippo et al. | |
| 7,726,103 | B2 | 6/2010 | Chapougnot | |
| 8,015,783 | B2 * | 9/2011 | Iwasa et al. | B65B 9/20 53/201 |
| 8,066,137 | B2 | 11/2011 | Sanfilippo et al. | |
| 8,231,024 | B2 | 7/2012 | Sanfilippo et al. | |
| 8,602,242 | B2 | 12/2013 | Sanfilippo et al. | |
| 8,602,244 | B2 | 12/2013 | Sanfilippo et al. | |
| 2001/0030106 | A1 | 10/2001 | Yamamoto et al. | |
| 2002/0046548 | A1 * | 4/2002 | Forman | B65B 9/2042 53/412 |
| 2002/0177380 | A1 * | 11/2002 | Forman et al. | B29C 66/81427 442/366 |
| 2004/0151481 | A1 * | 8/2004 | Cassoli et al. | B29C 65/10 392/379 |
| 2005/0069230 | A1 * | 3/2005 | Takahashi et al. | B65D 75/008 383/104 |
| 2007/0271878 | A1 * | 11/2007 | Hendriks et al. | B65B 9/20 53/451 |
| 2010/0011711 | A1 | 1/2010 | Gehring et al. | |
| 2010/0061665 | A1 | 3/2010 | Inagaki et al. | |
| 2010/0210438 | A1 * | 8/2010 | Nakagawa et al. | B65B 9/2028 493/186 |
| 2011/0131935 | A1 | 6/2011 | Kondo et al. | |
| 2012/0055120 | A1 * | 3/2012 | Bierschenk et al. | B65B 51/146 53/451 |
| 2012/0211389 | A9 | 8/2012 | Sanfilippo et al. | |
| 2012/0225763 | A1 | 9/2012 | Shimoda et al. | |
| 2014/0083897 | A1 | 3/2014 | Sanfilippo et al. | |
| 2014/0102936 | A1 | 4/2014 | Sanfilippo et al. | |
| 2014/0109522 | A1 | 4/2014 | Sanfilippo et al. | |
| 2014/0185962 | A1 | 7/2014 | Sanfilippo et al. | |
| 2014/0196406 | A1 | 7/2014 | Sanfilippo et al. | |
| 2014/0283489 | A1 * | 9/2014 | Zhu | B65B 61/28 53/491 |

FOREIGN PATENT DOCUMENTS

| | | | | |
|---|---|---|---|---|
| DE | 2901053 | A1 * | 7/1980 | ........... B65B 9/2014 |
| DE | 2909479 | A1 * | 9/1980 | ........... B65B 9/2028 |
| DE | 3824753 | A1 * | 9/1989 | ............ B65B 9/213 |
| DE | 102005041192 | A1 * | 3/2007 | ........... B65B 51/306 |
| EP | 0029419 | A1 | 5/1981 | |
| EP | 2364838 | A1 * | 9/2011 | ........... B65B 9/2028 |
| GB | 1016924 | A | 1/1966 | |
| GB | 1085600 | A * | 10/1967 | ........... B65B 9/2042 |
| JP | 06032327 | A | 2/1994 | |
| JP | 06122406 | A * | 5/1994 | |
| JP | 06156451 | A | 6/1994 | |
| JP | 06183418 | A * | 7/1994 | |
| JP | 3224526 | B2 * | 10/2001 | ........... B65B 9/2042 |
| WO | 9534472 | A1 | 12/1995 | |
| WO | WO 2005118404 | A1 * | 12/2005 | ............. B29C 65/18 |

* cited by examiner

METHOD AND APPARATUS FOR MAKING A STRUCTURALLY RESILIENT PACKAGE

CROSS-REFERENCE TO RELATED APPLICATIONS

This non-provisional application claims priority to, relies on, and has been filed within the twelve months of the filing date of U.S. Provisional Patent Application Ser. No. 62/072,093, filed Oct. 29, 2014, entitled "METHOD AND APPARATUS FOR MAKING A STRUCTURALLY RESILIENT PACKAGE," the technical disclosure of which is hereby incorporated by reference in its entirety, U.S. Provisional Patent Application Ser. No. 61/898,593, filed Nov. 1, 2013, entitled "STRUCTURALLY RESILIENT PACKAGE," the technical disclosure of which is hereby incorporated by reference in its entirety, and U.S. Provisional Patent Application Ser. No. 61/898,626, filed Nov. 1, 2013, entitled "SYSTEM AND METHOD FOR MAKING A STRUCTURALLY RESILIENT PACKAGE," the technical disclosure of which is hereby incorporated by reference in its entirety.

BACKGROUND OF THE INVENTION

Technical Field

The present invention relates to a structurally resilient package and an apparatus and method for its manufacture.

Description of Related Art

Many foodstuffs, such as potato chips, are packaged in pillow pouch packages. These packages are called pillow pouch packages because they have a shape that resembles a pillow. Such packages do not stand upright and must lean on other product to remain vertical. When such a package is open, consumers must take care to prevent the package from falling over and spilling its contents. Thus, consumers must lean and orient the package so that the package remains stable. Consequently, it is desirable to have a package which is stable, self-standing, and structurally resilient.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1A:
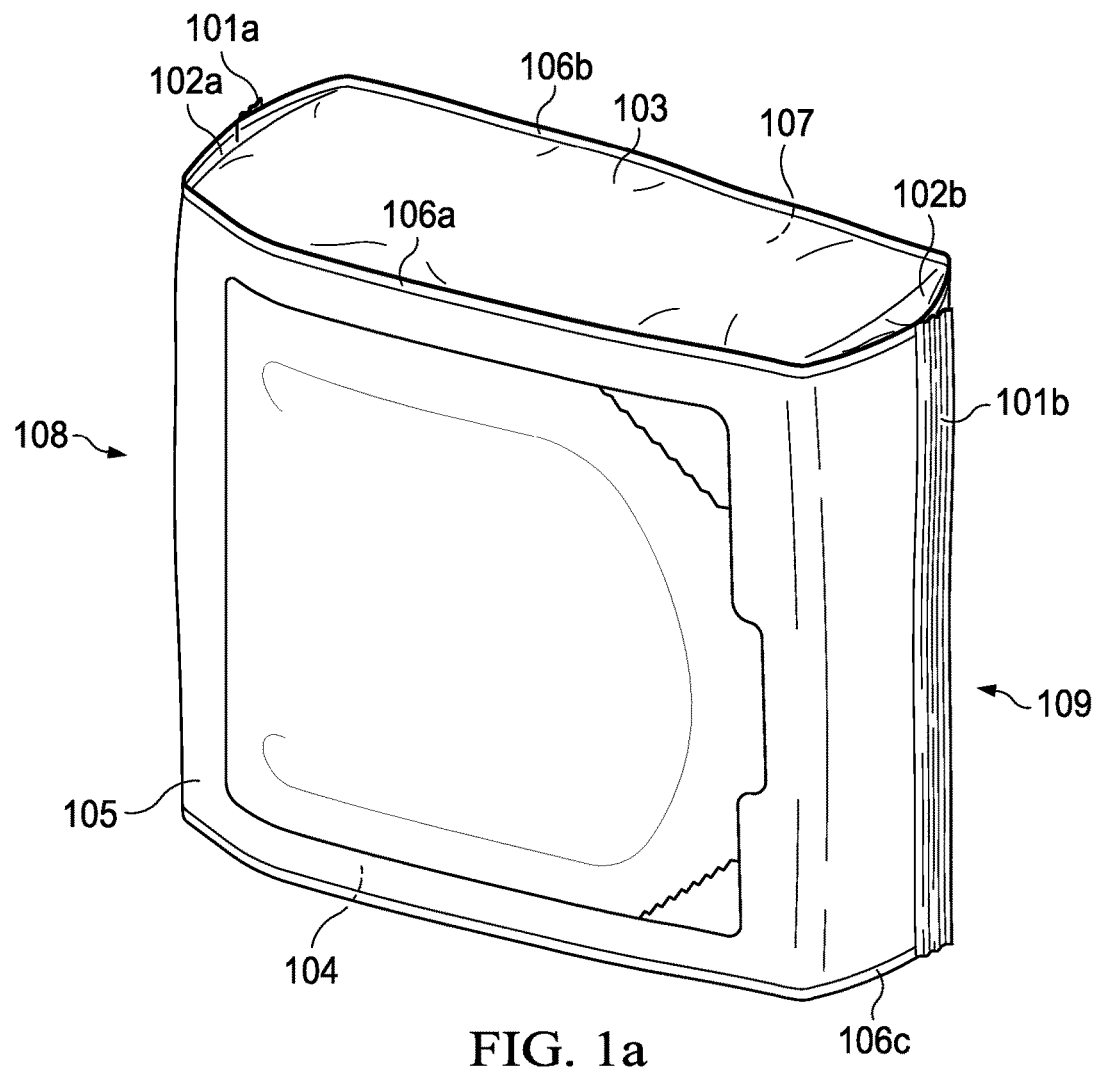
FIG. 1a is a top front perspective view of a package in one embodiment.
Figure 1B:
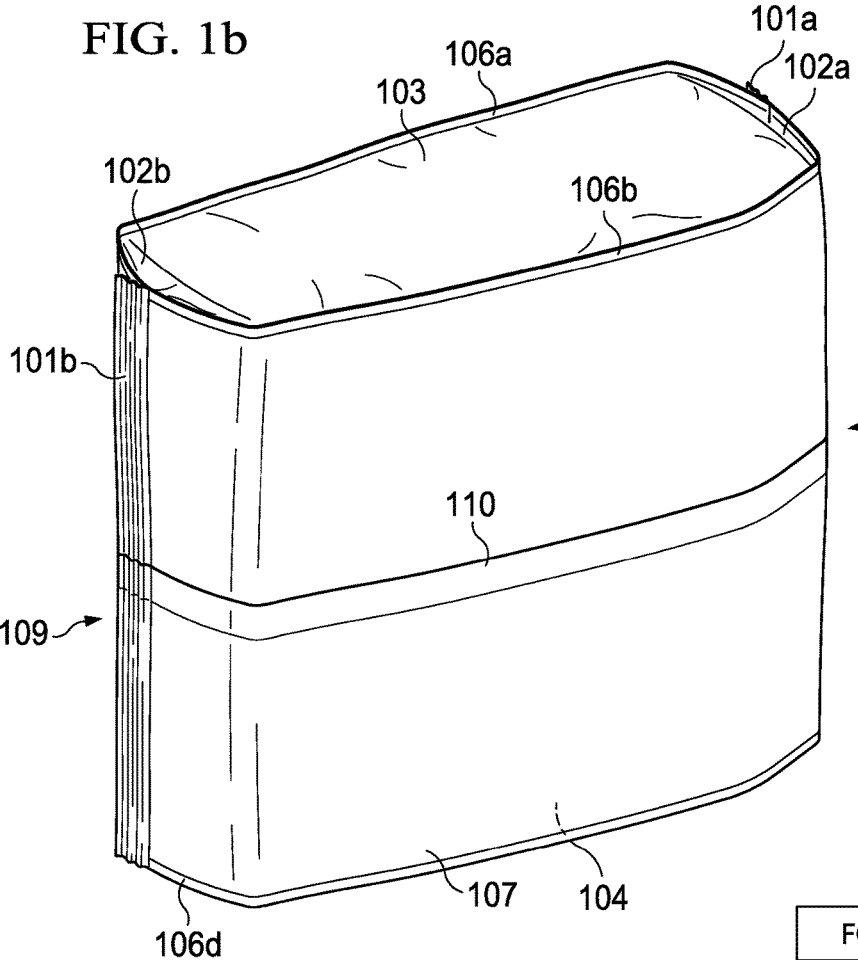
FIG. 1b is a top back perspective view of a package in one embodiment.

FIG. 1a is a top front perspective view of a package in one embodiment. FIG. 1b is a top back perspective view of a package in one embodiment. In one embodiment, the package comprises a generally cubed shape. While an embodiment utilizing a cube shape will be described, this is for illustrative purposes only and should not be deemed limiting. A rectangular and other polygonal shapes can also be obtained.

The package can comprise virtually any material commonly used for packaging. In one embodiment the packaging film is a composite polymer produced by a film converter. For example, in one embodiment the composite film uses a sealable inside, or product side, layer which typically comprises metalized oriented polypropylene ("OPP") or metalized polyethylene terephthalate ("PET"). A sealant layer disposed upon the product side of the metalized film enables a hermetic seal to be formed by sealing jaws at a temperature lower than the melt temperature of the film. In one embodiment the sealant layers include an ethylene-propylene co-polymer and an ethylene-propylene-butene-1 ter-polymer, though this is not limiting as virtually any packaging film can be utilized.

In one embodiment the film comprises barrier properties in one or more layers to protect the product inside the package from light, oxygen or moisture. Such a need exists, for example, for the protection of foodstuffs, which can run the risk of flavor loss, staling, or spoilage if the barrier properties are lacking.

In one embodiment, adjacent to the metalized inside layer is a laminate layer, such as a polyethylene extrusion, and an outer ink or graphics layer. The ink layer is used for presentation of graphics that can be viewed through a transparent outside layer, which can comprise OPP or PET. The overall thickness of the film can be adjusted due to a variety of factors, including but not limited to, cost, desired package rigidity, etc. In the prior art, a thinner film is preferred as this results in decreased material costs as well as decreased shipping costs. However, in one embodiment a thicker film is utilized. In one embodiment the film has a thickness between 2 and 4 mil. While such a thickness goes against the teaching of the prior art, such a thickness adds increased rigidity to the package. This allows a package to be constructed which has sufficient rigidity to maintain a desired shape, as will be discussed in more detail below.

As depicted the package comprises a front face 105 and a back face 107 (depicted in FIG. 1b). The front face 105 is parallel to the back face 107. In one embodiment the front face 105 comprises a rectangular shape. Perpendicular to and connecting the front 105 and back 107 faces are a top face 103 and a bottom face 104. Also perpendicular to and connecting the front 105 and back 107 faces are a left side 108 and a right side 109.

At the approximate intersection between the front 105 and back 107 faces and the top side 103 are hem seals 106*a*,*b*. Also, at the approximate intersection between the front 105 and back 107 faces and the bottom side 104 are hem seals 106*c*,*d*. Hem seals, as used herein, refer to a seal sealing one or more adjacent layers to form a hem. Although some embodiments of the invention are described using hem seals, hem seals are not required in all embodiments of the invention. In some embodiments, hem seals are not used.

The hem seals 106 offer increased structure to the package. Such seals would not be typically used because they result in increased manufacturing costs due to the increase in amount of film needed to make a package. However, as noted above, the hem seals 106 increase the structural rigidity of the package and help the package maintain the desired shape.

The embodiment depicted comprises four hem seals: two upper hem seals 106*a*,*b* and two lower hem seals 106*c*,*d*. This is not limiting, however, as virtually any number of hem seals can be utilized. Further, while all hem seals 106 depicted are all parallel, in other embodiments one or more hem seals 106 can be perpendicular to other hem seals 106. For example, referring to FIG. 1*a*, in one embodiment hem seals are located at the intersection between the front face 105 and the left 108 and right sides 109. Hem seals 106 provide structural rigidity and help maintain a desired shape. As depicted, the desired shape is a rectangular prism- or cube-shaped package. As used herein, the term "cube-shaped" or the term "cubed" can refer to an actual cube or in some cases it can refer to a shape that resembles a cube. The hem seals 106 help define the cube shape by defining square boundaries of the front 105 and back 107 faces. The hem seals 106 also help define an approximately ninety-degree intersection between, for example, the front face 105 and the top face 103. Such an intersection helps the product resemble and maintain the desired shape. In one embodiment, absent the hem seals 106 the intersection would be rounder.

The hem seals 106 can comprise virtually any shape and thickness. In one embodiment the hem seals 106 comprise a linear line, however this is not limiting. In other embodiments the hem seals 106 comprise a non-linear shape such as a sinusoidal wave or a chevron shape.

The width of the hem seal 106 can be adjusted to control the rigidity and structure of the package. In one embodiment the hem seal 106 comprises a width between 1 mm and about 5 mm.

The left side 108 and the right side 109 each comprise an end seal 101*a*,*b*. As depicted, end seals 101*a*,*b* are perpendicular to the orientation of the hem seals 106. The end seals 101 can comprise any end seal known in the art and can be created with any device known in the art, including sealing jaws. The width of the end seals 101 can vary, and in one embodiment range from between 0.25" to about 1".

The package further comprises gussets 102*a*,*b* viewable from the top perspective. As depicted these gussets are minimal in height so as to yield a cubed package. This allows the left 108 and right sides 109 to be more flat than round.

Graphics are not shown in FIGS. 1*a* and 1*b* for the sake of simplicity and clarity, but in one embodiment one or more faces of the package comprises graphics. In one embodiment, referring to FIG. 1*a*, graphics are located on the front face 105 and run perpendicular to the end seals 101*a*,*b*. Thus, when the package is oriented such that the end seals 101*a*,*b* are vertical, the graphics, such as text, are readable on the front face 105.

Referring to FIG. 1*b*, the back seal 110 is depicted. The back seal 110, in one embodiment, is oriented perpendicular to the end seals 101. The back seal 110 can comprise any seal known in the art and can be created with any device known in the art, including sealing jaws.

Figure 2:
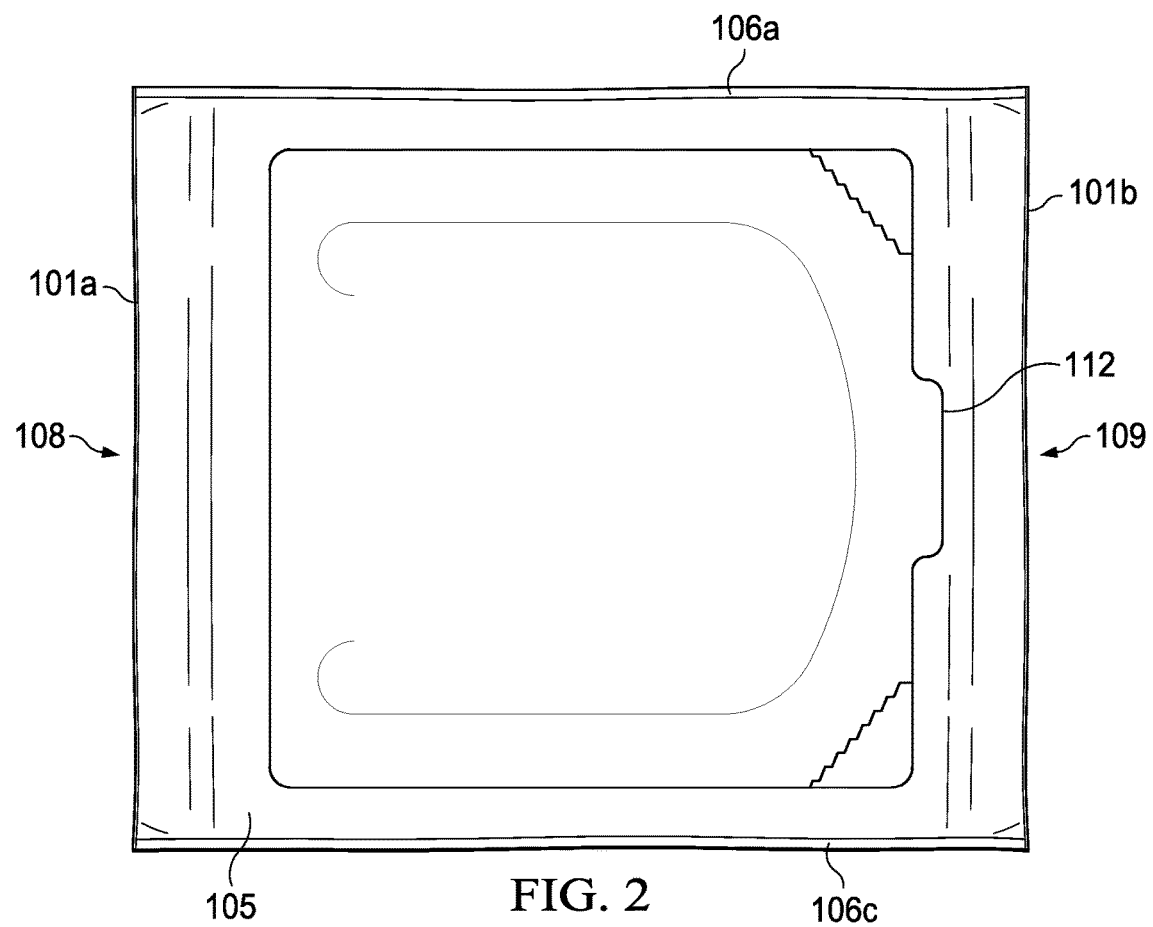
FIG. 2 is a top view of the package of FIGS. 1a and 1b.

FIG. 2 is a top view of the package of FIG. 1. As depicted, the front face 105 comprises a re-sealable opening 112. A re-sealable opening is any opening which once opened can be re-sealed. This can be accomplished via a variety of methods, including adhesives, zippers, etc. Virtually any device which provides for a re-sealable opening can be utilized. As depicted, the re-sealable opening 112 comprises a score line in the outer film layer with adhesive located on the inner film layer such that once the opening 112 is pulled open, the exposed adhesive allows the opening 112 to be re-sealed. As depicted the re-sealable opening 112 comprises a tab which allows the consumer to open the package.

While an embodiment has been discussed wherein the adhesive is located on the lower layer, this is for illustrative purposes only and should not be deemed limiting. In other embodiments, the adhesive is located on the upper layer. Additionally, in other embodiments, the opening feature may be located on different faces, for example on the top face 103, or the left 108 or right 109 faces. Further, the resealable opening may be replaced with just an opening without the resealing feature. Also, the resealable opening feature can be located on any face, in any orientation. Although, in some embodiments, there is no resealable opening feature and, for example, a user opens the package at an end seal.

There are several benefits to the package described herein. The first is increased structural rigidity. Due to several factors including increased film thickness and hem seals, the package has increased structural rigidity which allows the package to retain its desired shape. Thus, a user can open the package and the package will remain upright without external forces. The user can open the package on a flat surface such as a table, or the user can open the package on his or her lap. The increased rigidity allows the package to maintain its shape which reduces or eliminates the need for the user to take caution to prevent the package from tipping over and spilling. Second, because of the rigidity, the package can act as a bowl. Consumers often pour chips into a bowl. Due to the increased rigidity, the package acts as a bowl meaning the consumers can obtain the benefits of a bowl without having to retrieve a second bowl. Third, because the package, in one embodiment, is opened on its front face which has increased surface area compared to its side or top face, retrieving contents from the front face is easier for the consumer.

The package described above can be made in a variety of ways. The process can include steps used to make so-called "Vertical Stand-Up Pouches" on a vertical form, fill, and seal machine, such as the process described in U.S. Pat. Nos. 7,500,340, 7,197,859, 7,299,608, 7,032,362, 6,860,084, 6,679,034, and 6,722,106, which are hereby incorporated by reference in their entirety.

Figure 3:
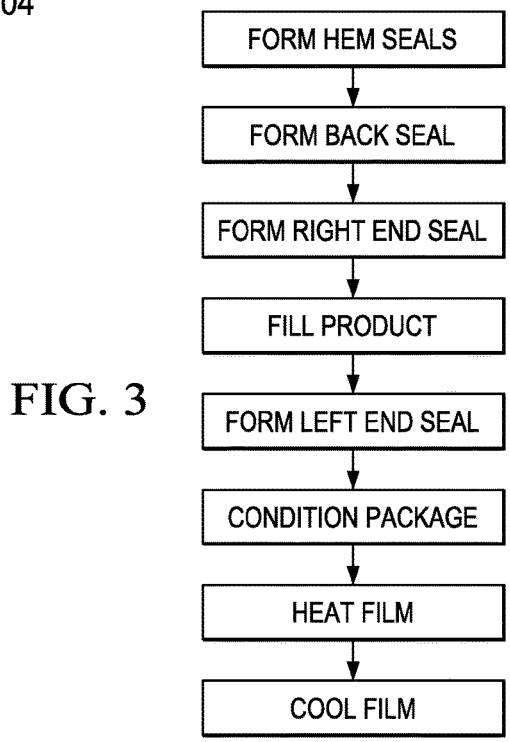
FIG. 3 depicts a flow chart of the manufacturing process in one embodiment utilizing a vertical form, fill, and seal machine.

FIG. 3 depicts a flow chart of the manufacturing process in one embodiment utilizing a vertical form, fill, and seal machine. Those skilled in the art will understand that the order of the flow chart can be rearranged. Thus, FIG. 3 is for illustrative purposes only and should not be deemed limiting.

The first step in FIG. 3 is that of forming the hem seals. Film for packaging is typically unrolled from rolls of wound film. In one embodiment the hem seals 106 are added prior to the film being introduced to the former in the vertical form, fill, and seal machine. The film is pulled and bunched together in the desired location of the hem seal 106 and sealed. In one embodiment seal jaws are utilized. Once formed, the film is wrapped around the former.

The film is then formed into a vertical tube wrapped around a product delivery cylinder. The vertical tube is vertically sealed along its length to form a back seal 110.

The vertical tube is then pulled downward and a lower transverse seal is formed. The lower transverse seal becomes the left end seal 101a when the package is properly oriented.

In one embodiment the lower transverse seal of an upstream package is made simultaneously with the upper transverse seal of a downstream package. In such an embodiment, one pair of sealing jaws simultaneously creates the lower transverse seal and the upper transverse seal of a downstream package and severs the two packages with a knife or other cutting device.

In one embodiment, simultaneously with the sealing of the upper and lower transverse seals, a gusset is created adjacent to the seals. The gusset can comprise any gusseting mechanism known in the art, including gusseting mechanisms described in U.S. Pat. Nos. 7,500,340, 7,885,574, 8,132,395, and EP Patents EP 2332841B1 and EP 2218647B1, the entirety of which are incorporated herein by reference. In one embodiment a continuous motion rotary gusset and sealing jaws are utilized to create the end seals 101 and the gussets 102. In one embodiment the continuous motion rotary gusset and sealing jaws mechanism moves at a slower vertical speed than the vertical speed that the film is pulled. This causes the film to bunch at the location of the gusset mechanism, resulting in a flatter and squarer left and right side of the final package.

After the lower transverse seal is formed, product is delivered into the partially sealed package. The film is then pulled downward and an upper transverse seal, which will later become the right end seal 101b, is created. As noted, in one embodiment, simultaneous with the creation of the upper transverse seal, the package is severed from the upstream film resulting in an intermediate package.

The intermediate package resembles the final package, but in one embodiment, additional steps are taken to further increase the rigidity and ability to maintain the desired shape. These steps can take place on the same machine which made the package, for example, on the vertical form, fill, and seal machine. Or a separate machine can take these further steps. In one embodiment, after the intermediate package is formed, the package is placed into a cubing mechanism. The cubing mechanism manipulates the intermediate package to ensure it has a more cube-like shape and to increase structural rigidity.

In one embodiment, the package is dropped into a cubing mechanism which comprises a flighted conveyor. In one embodiment, the dimensions of the flighted conveyor correspond to the desired shape of the finished product. In one embodiment the flighted conveyor surrounds the periphery of the package such that every side but one is in contact with the flighted conveyor. This allows the flighted conveyor to apply pressure against all sides except for one face. In one embodiment, the right side 109 is the face that is not in contact with the flighted conveyor.

In one embodiment, the cubing mechanism first conditions the intermediate package. This is accomplished by vibrating and rocking the package in an up and down motion. This helps force the air into the corners of the package which allows for a more squared package.

In one embodiment during the conditioning step, the flighted conveyor applies and removes pressure multiple times while rocking back and forth. In one embodiment, the package is dropped into the flighted conveyor such that the package is resting on the left face 108, with the right face 109 being exposed. By applying pressure and removing pressure multiple times while rocking back and forth, the pressure and weight of the package forces the bottom of the package, which becomes the left face 108, to square up. Simultaneously, the bottom of the flighted conveyor, which is in contact with the heated end seal 101a of the left side 108, cools the end seal 101a. This cooling step further aids in setting the shape of the left side 108 of the package. Additionally, as noted, the motion and rocking during the conditioning step pushes air to the corners of the package, allowing the package to become squarer. In some embodiments, the conditioning step optionally includes the application of heat.

After the conditioning, the film is heat treated by increasing the temperature of the film. In one embodiment a hot plate is brought into contact with the package to soften the film. The temperature of the hot plate can range from about 150° F. to about 250° F. In other embodiments the temperature of the hot plate ranges from about 180° F. to about 220° F. In one embodiment, the time of contact with the hot plate ranges from about 1 to about 4 seconds. In one embodiment the hot plate comprises a plurality of hot plates which surrounds the periphery of the intermediate package.

After the heat treating, the film is cooled to set the film in place. This cooling step increases the structural rigidity of the film. The film hardens as it cools, and as it cools in the desired shape, it will maintain that desired shape. Thus, the heat treatment followed by a cooling step increases the structural rigidity of the film.

Figure 4:
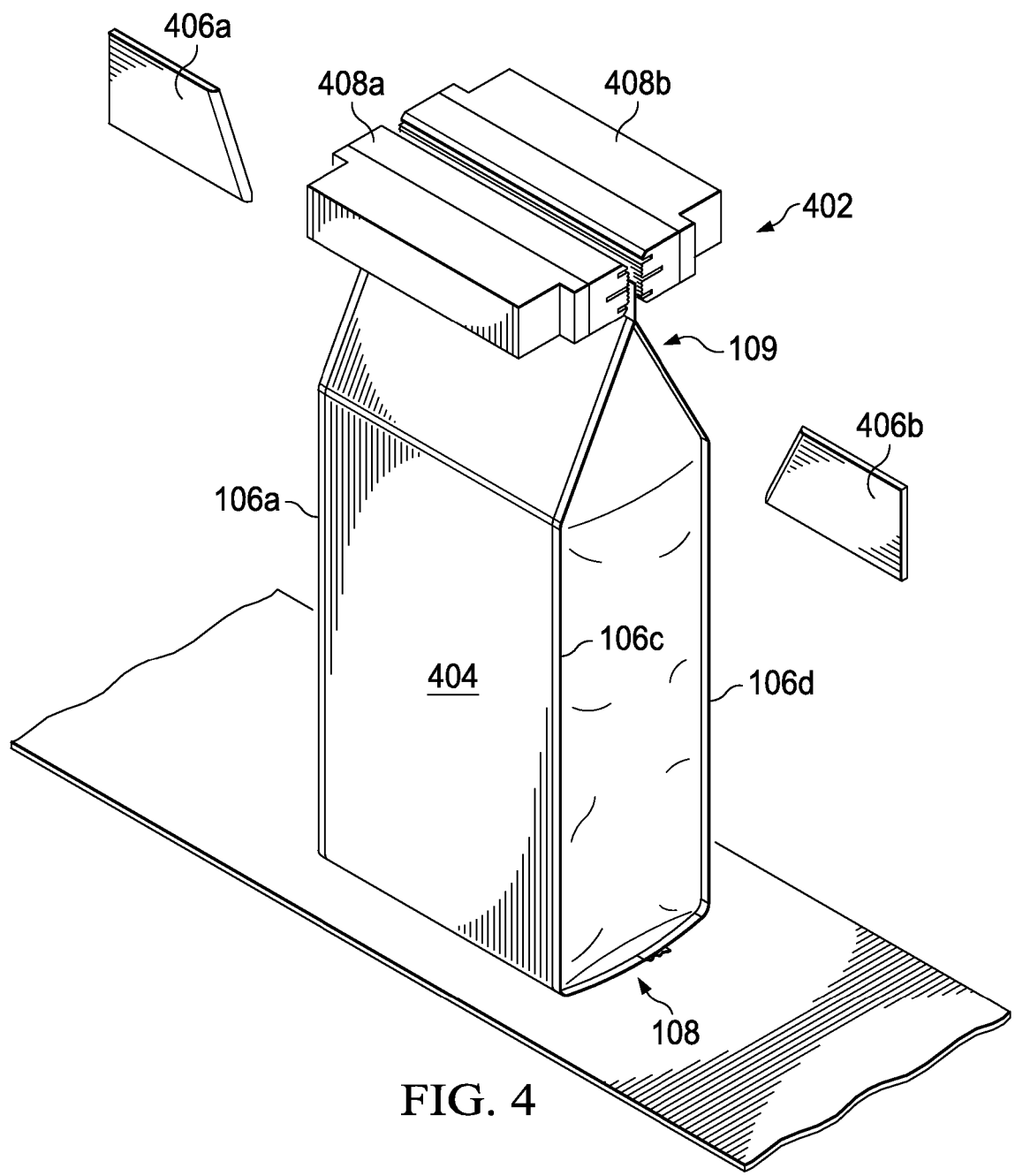
FIG. 4 is a schematic showing one embodiment of the invention.

Another embodiment of the invention will now be discussed with respect to FIG. 4. In this embodiment, a first machine 402 (e.g. vertical form, fill, and seal machine) forms a package 404 (e.g. bag) with hem seals (e.g. hem seals 106a, c, d). Although, in some embodiments the package does not comprise hem seals. The package has a flat left face 108 (which is the bottom as the bag is made on the first machine). However, the right face 109 of the package is not formed flat but merely gusseted inward using gusseters (e.g., top gusseters 406a, b, which are shown as vertical gusseters). In other words, after the package is created by the first machine, the left face 108 is flat, but the right face 109 is not flat. The package is then sent to a second machine (e.g. a cubing mechanism or rectangular-prism-forming mechanism) to form a flat right face 109 and to form a package with a desired shape (e.g. cube, rectangular prism, polygon, etc.). Although this embodiment results in many advantages, it can also have disadvantages. For example, the second machine used to form a package with a desired shape can be complicated, expensive, and require significant floor space in a packaging room. Accordingly, it can also be desirable to form a package with a desired shape (e.g., cube) on a first machine (e.g., vertical form, fill, and seal machine) without using a second machine (e.g., a cubing mechanism).

Figure 4A:
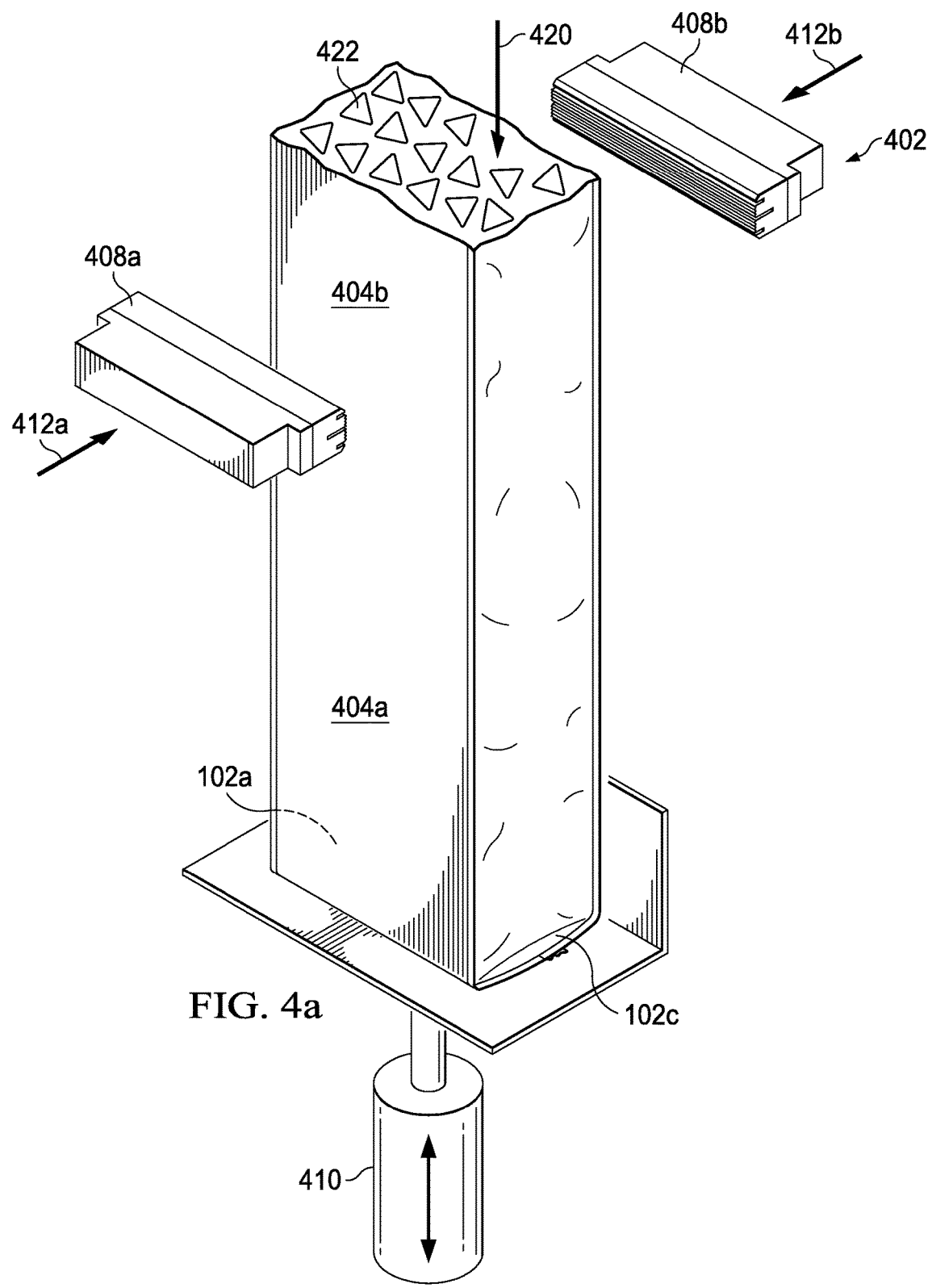
FIGS. 4a-4c are schematic views showing the sequence of operation of the formation of a package in accordance with one embodiment of the present invention.
Figure 4B:
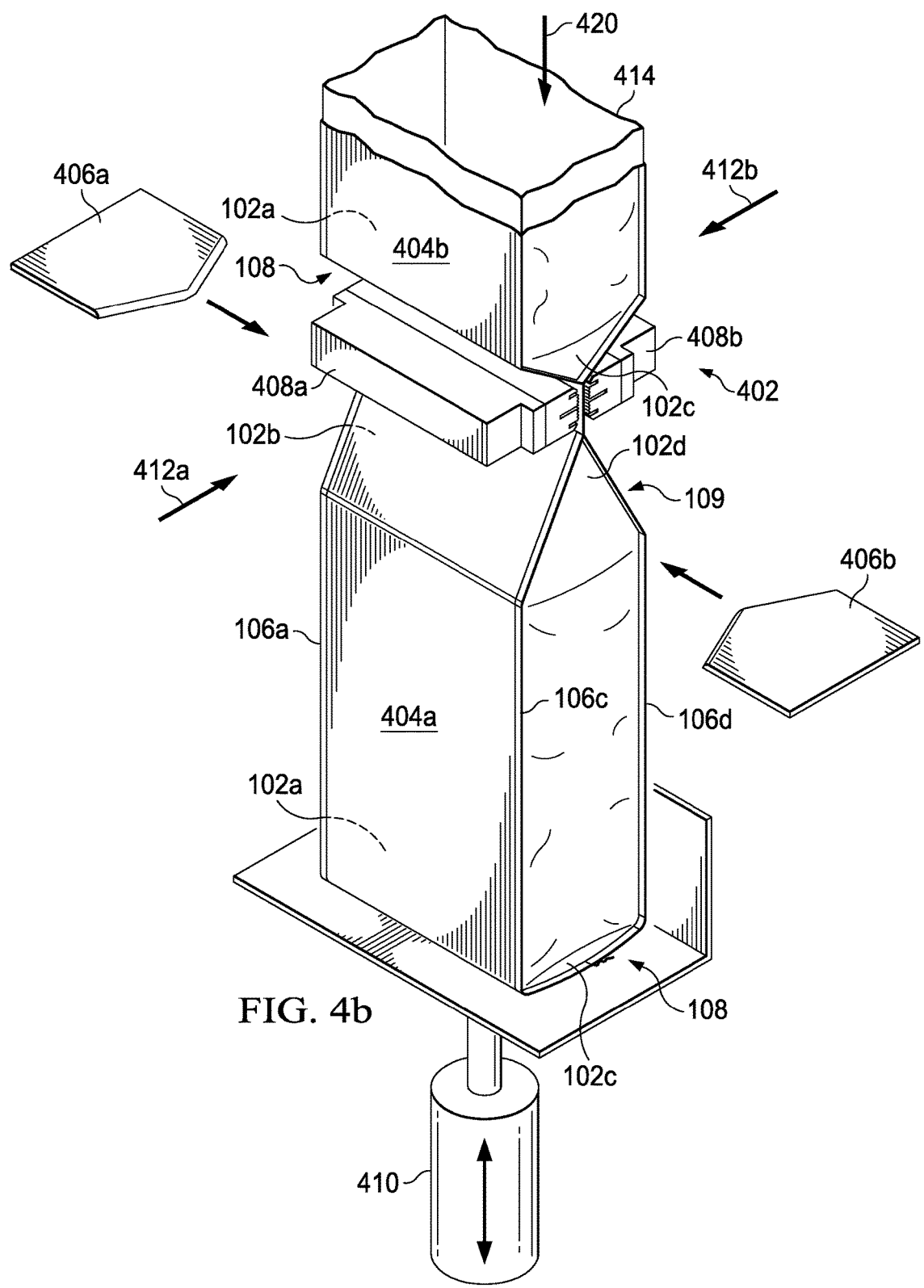
Figure 4C:
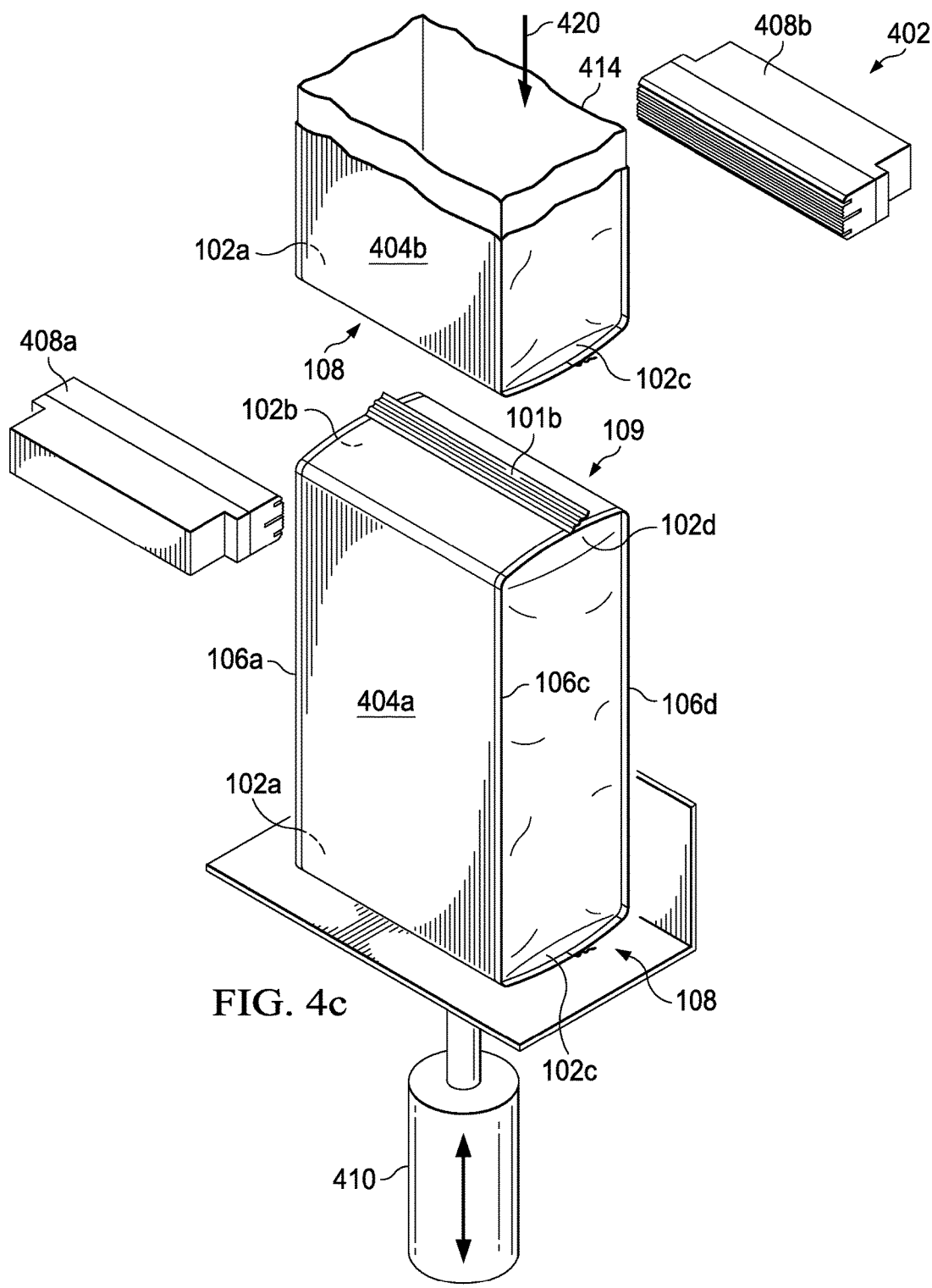

Another embodiment will now be discussed with respect to FIGS. 4a-4c and FIGS. 5a-5h. As an initial matter, FIGS. 4a-4c show a partially formed package becoming a package, although components of a package-making apparatus have been omitted. Meanwhile, FIGS. 5a-5h show several (though not all) components of the package-making apparatus but the package has been omitted for clarity. The embodiment shown in FIGS. 4a-4c and 5a-5h saves time, space, equipment, and money in comparison to the embodiment discussed with respect to FIG. 4. In this embodiment, a first package 404a is completely formed into a desired shape on a first machine 402 (e.g. vertical form, fill, and seal machine). In other words, the package does not need to be sent to a second machine (e.g., cubing mechanism) to be completely formed into the desired shape. For example, in one embodiment, while the first package 404a is on the vertical form, fill, and seal machine 402, both the left face 108 and the right face 109 of the package are flattened. Because the package leaves the machine with a flat left face 108 and a flat right face 109, there is no need for a second machine to flatten the right face.

In the embodiment shown in FIGS. 4a-4c and 5a-5h, a first end seal (e.g., the left end seal 101a of a second package 404b, for example, left end seal 101a shown in FIG. 1a) and a second end seal (e.g., the right end seal 101b of a first package 404a) are formed simultaneously. In a first step, as shown in FIG. 4a, a package film is provided and wrapped around the fill tube of a vertical form, fill, and seal machine.

Figure 5A:
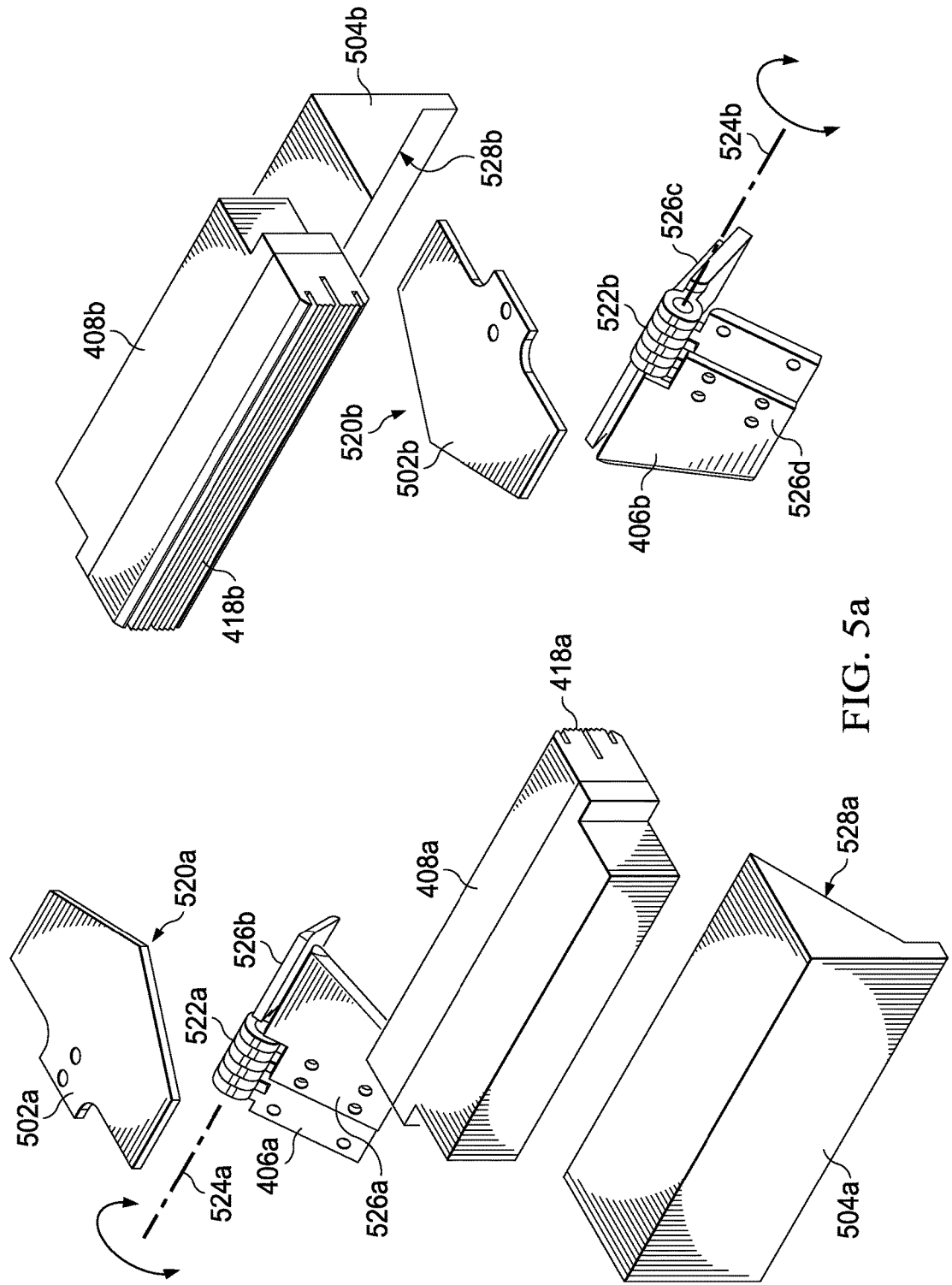
FIGS. 5a-5h are schematic views showing the sequence of operation of the formation of the packaging film in accordance with one embodiment of the present invention.
Figure 5B:
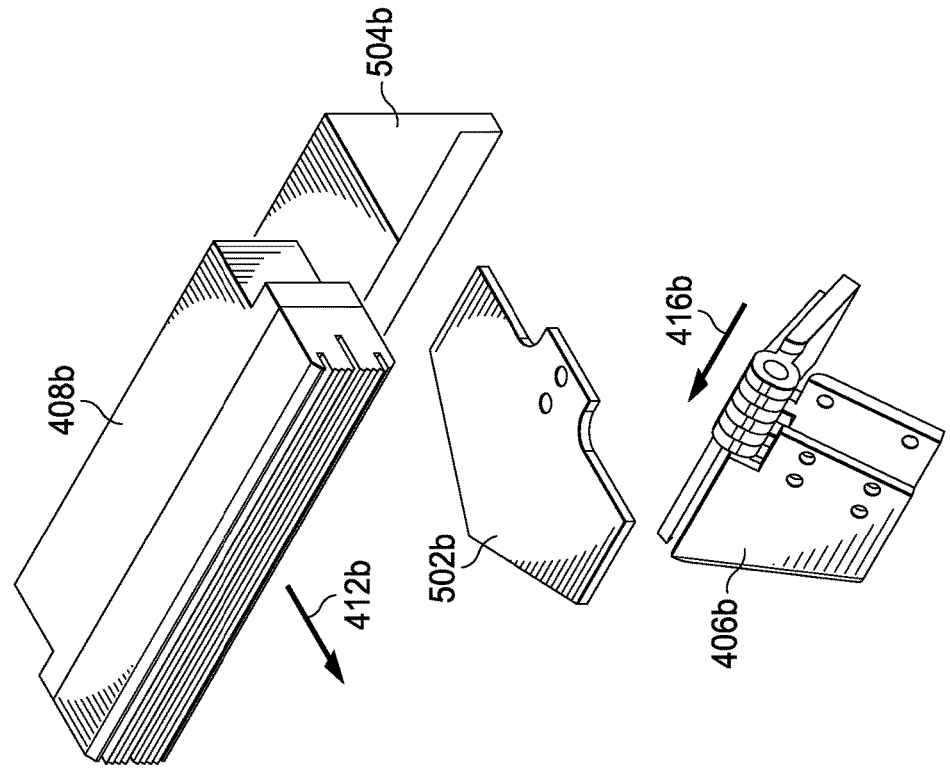
Figure 5B:
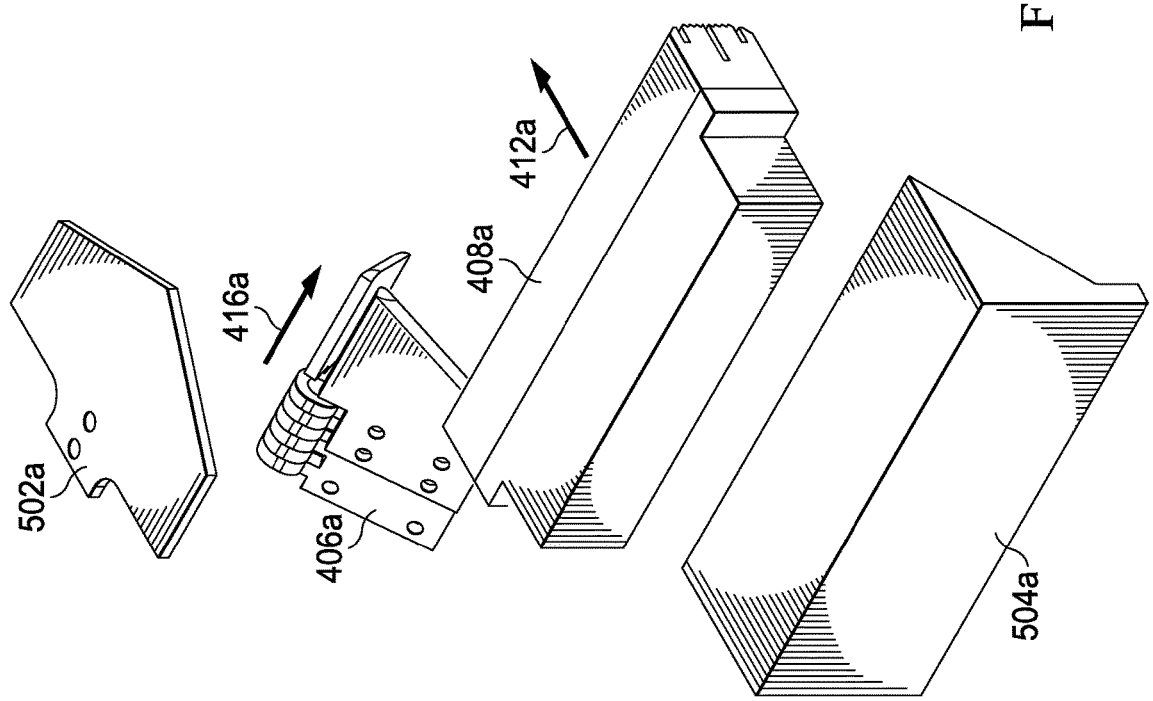

Second, as shown in FIGS. 4b and 5b, first and second seal jaws 408a,b move from a home position toward the film (e.g., in directions 412a,b). These seal jaws form both the first end seal of the second package and the second end seal of the first package as they press against the film. In some embodiments, the seal jaws also cut the film to separate the first end seal of the second package and the second end seal of the first package.

Third, as shown in FIG. 5b, while the first and second seal jaws 408a,b move toward the film, bottom gusseters 502a,b and top gusseters 406a,b also move in directions 416a,b toward the film and away from a home position. Upon contact with the package, the bottom gusseters and top gusseters form bottom gussets 102a,c in the second package and top gussets 102b,d in the first package, respectively. For example, a first and second top gusseter 406a,b form top gussets (e.g., third and fourth gussets 102b,d, respectively, in the first package 404a) adjacent to right face 109 of the first package 404a. Simultaneously, first and second bottom gusseters 502a,b form bottom gussets (e.g., first and second gussets 102a,c, respectively, in the second package 404b) adjacent to left face 108 of the second package 404b. As shown in FIG. 5b, the bottom gusseters are horizontal gusseters and the top gusseters are rotatable gusseters or folding gusseters.

Fourth, as shown in FIG. 4b, while the top gusseters 406a,b move toward the film, a lifter 410 lifts the first package 404a to relieve the weight of the first package 404a on the package film. In other words, the first package 404a is supported from below by the lifter 410 rather than being suspended from seal jaws 408a,b. This allows the top gusseters 406a,b to form the right face 109 of the package into a flat shape without tearing the film or having a substantial probability of tearing the film. As shown in FIG. 4b, the top gusseters approach the first package in a flat, horizontal configuration. However, in some embodiments the top gusseters approach the first package in a folded configuration as shown in FIG. 5b. In some embodiments the top gusseters comprise a hinge with foldable portions. In other embodiments the top gusseters do not comprise a hinge and do not fold.

Figure 5C:
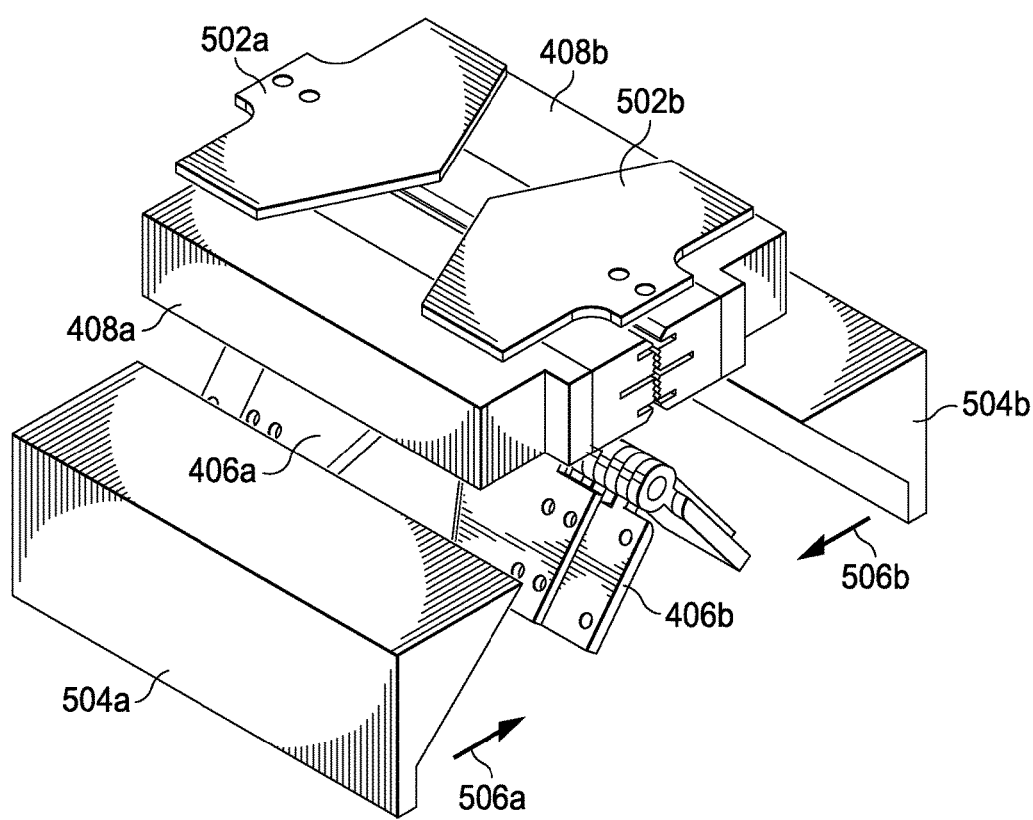

Fifth, as shown in FIG. 5c, while the seal jaws 408a,b and bottom and top gusseters 502a,b, 406a,b are in contact with the package film, tuckers 504a,b move toward the film and away from a home position (e.g., in directions 506a,b). The tuckers contact the first package (e.g. at the front face and back face) and apply pressure to first package. Accordingly, the tuckers indirectly apply pressure to the top gussets 102b,d of the first package 404a. In some embodiments, by putting pressure on the top gussets, the tuckers condition the film so that the film is taut and flat (e.g., to prevent the formation of wrinkles). In some embodiments, the tuckers compress gas in the package to condition the package and provide a film that is taught and flat.

Figure 5D:
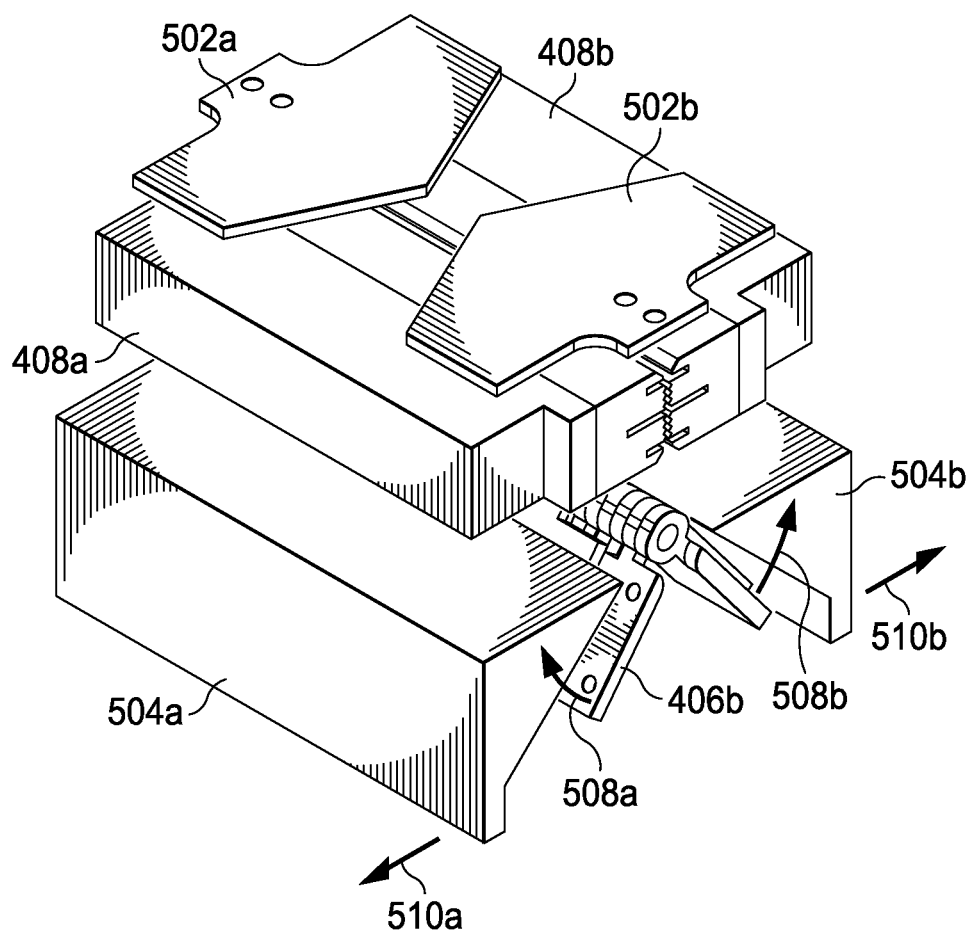
Figure 5E:
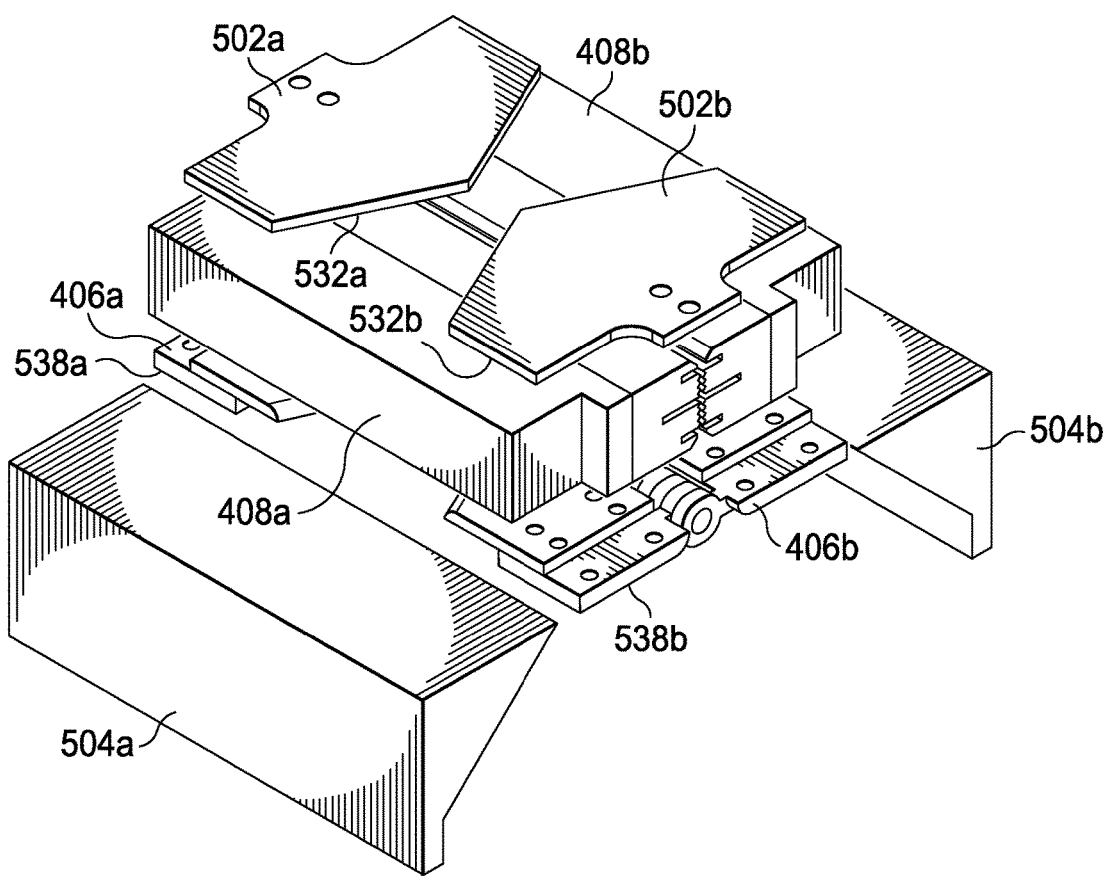

Sixth, as shown in FIGS. 5d-5e, top gusseters 406a,b rotate upward in directions 508a,b and push the second side (e.g. right face 109) of the first package 404a against the tuckers 504a,b as the tuckers move away from the first package in opposite directions 510a,b. This keeps the film under tension while the tuckers separate. Also, as the tuckers move away from the first package they expose a bottom surface of the seal jaws 408a,b, which are hot. The top gusseters press the second side of the first package against the exposed surface. This process flattens the second side (e.g. right face 109) of the first package 404a. In some embodiments, the film is heated using conductive heating from the seal jaws. In some embodiments, the seal jaws are at a temperature of 230° F.-320° F. Although, in some embodiments, the seal jaws can seal, flatten, or crease the film using other technologies (e.g., the seal jaws can be ultrasonic seal jaws that use ultrasonic technology). In some embodiments the second side of the package is pressed against the seal jaws for about 50 to about 250 milliseconds.

Seventh, the bottom gusseters 502a,b press the first side (e.g., left face 108) of the second package 404b against an exposed top surface of the seal jaws 408a,b. In some embodiments, the bottom gusseters are assisted in forming gussets in and flattening the first side of the second package by a product conduit 414 (e.g., former 414), which supports the second package from the inside along its entire length (e.g., from the first side to the second side) and has a rectangular cross section. In some embodiments, the bottom gusseters slide in between the product conduit and the seal jaws 408a,b to form gussets in the first side of the second package and then press the first side of the second package against the seal jaws.

Figure 5F:
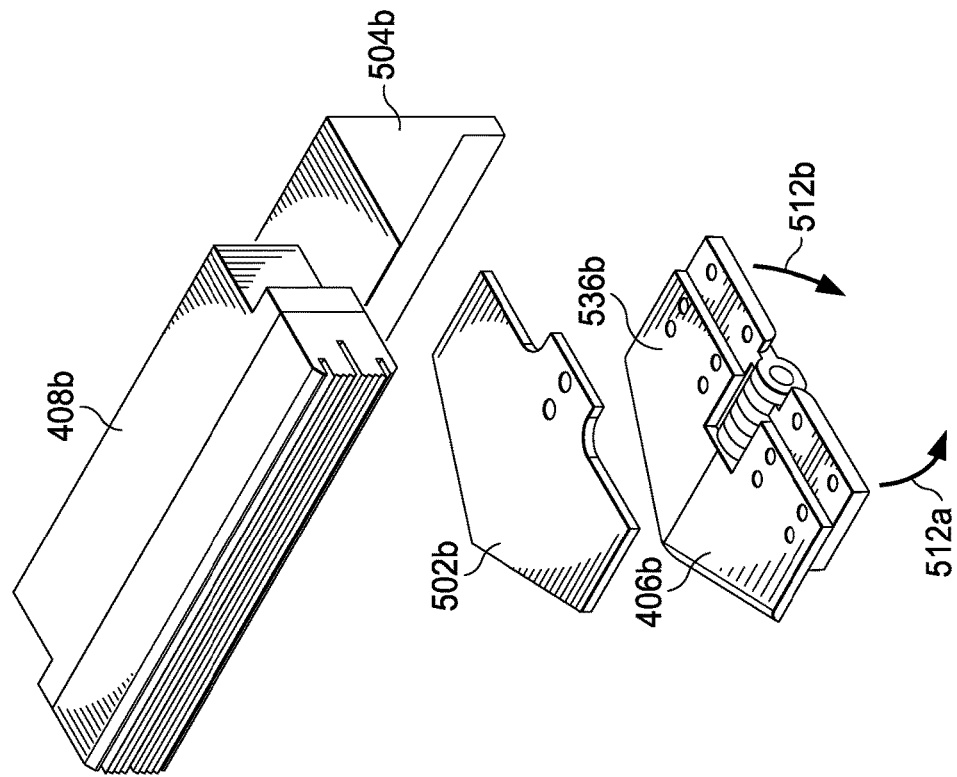
Figure 5F:
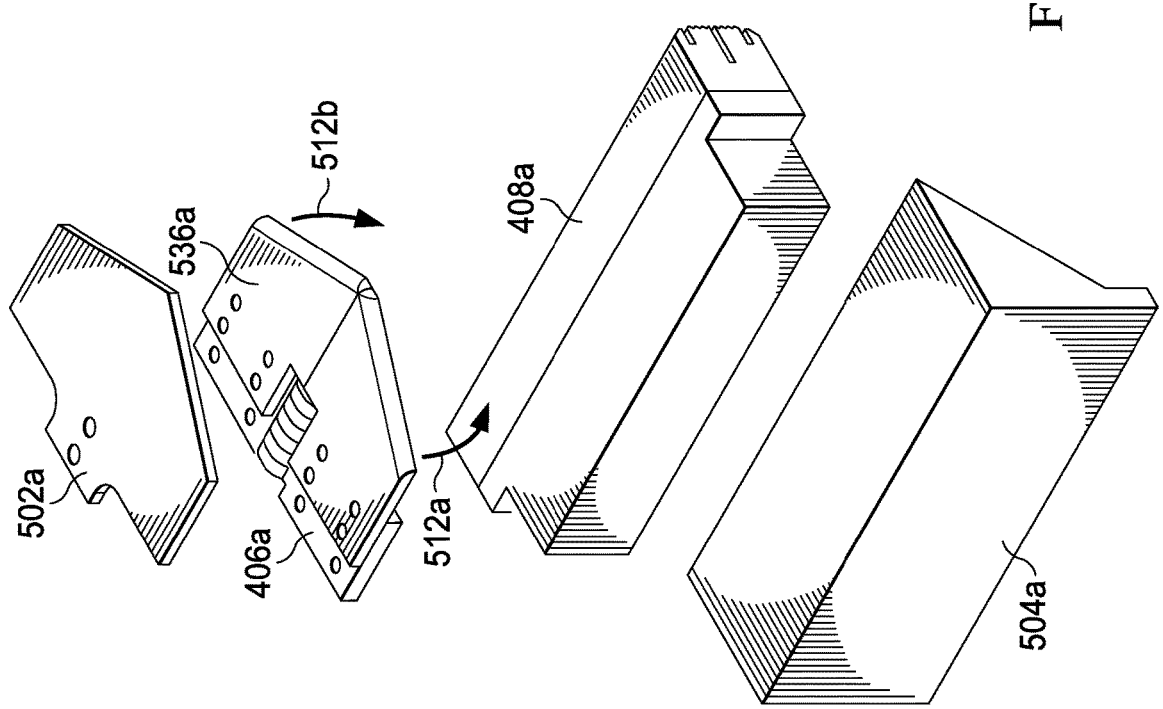
Figure 5G:
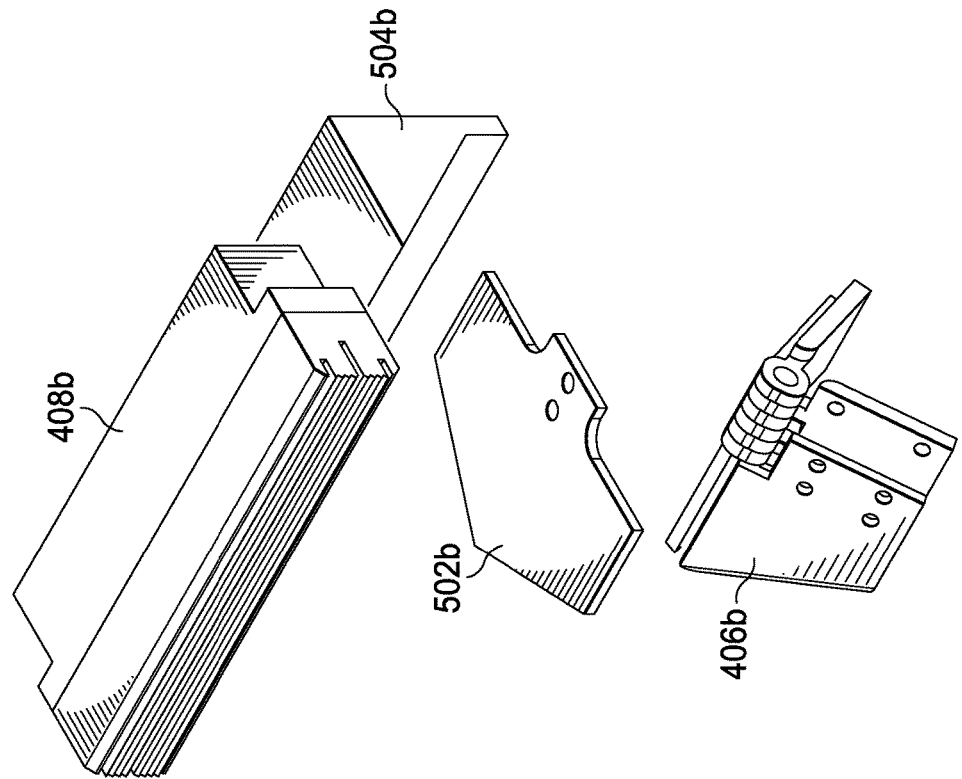
Figure 5G:
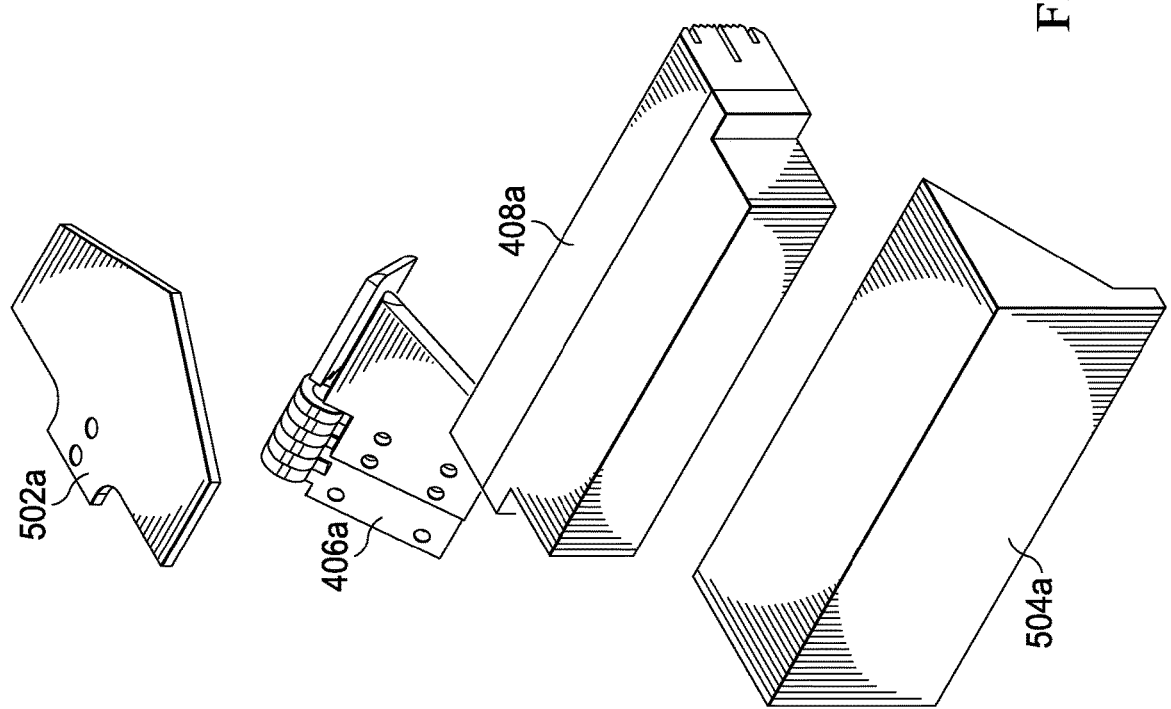
Figure 5H:
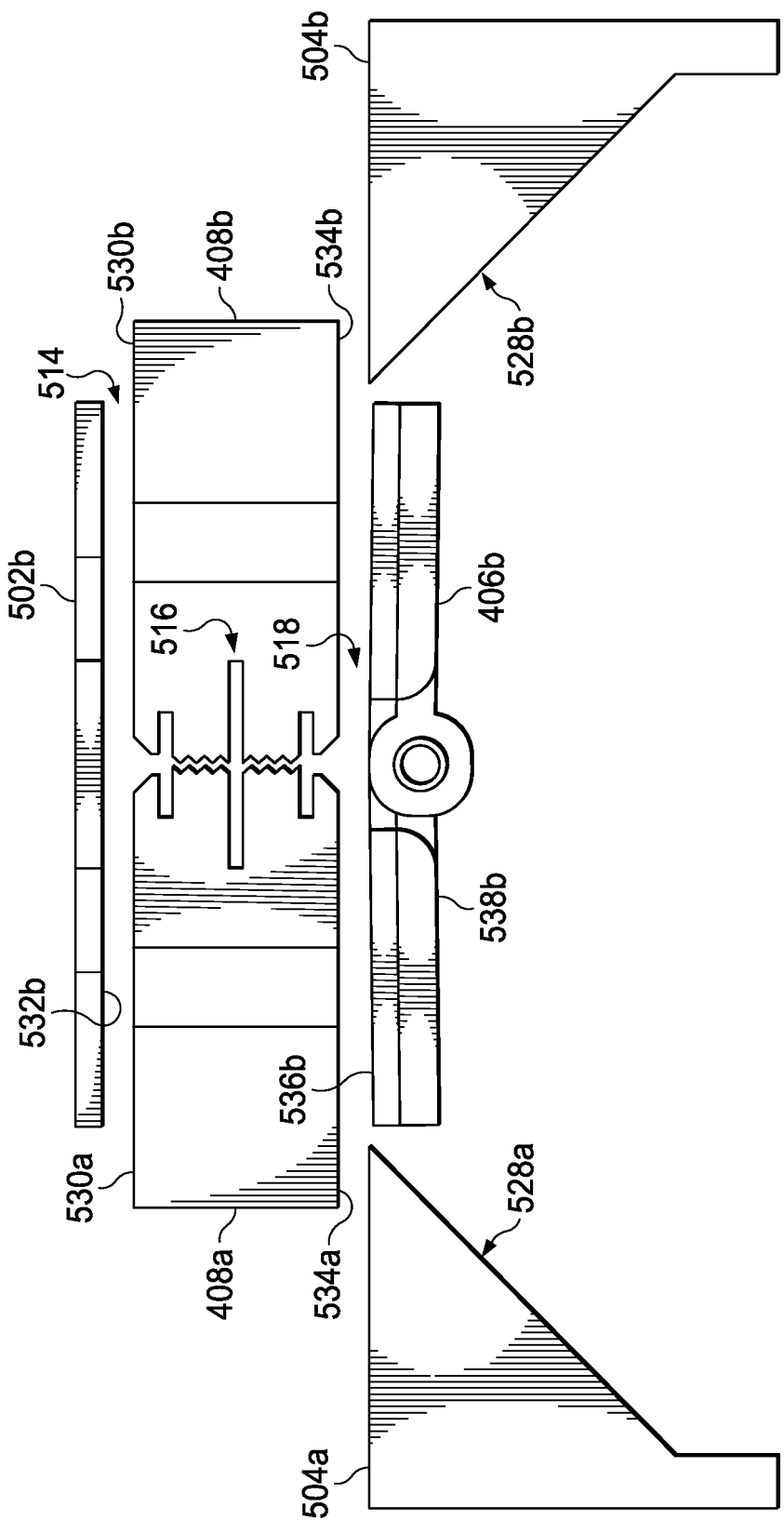

FIG. 5h shows a schematic side view that corresponds to the schematic perspective view shown in FIG. 5e. As shown in FIG. 5h, a bottom gusseter (e.g., gusseter 502b) can be used to tuck the first side 108 of the second package 404b against the top surface of seal jaws 408a,b at a first location 514. A top gusseter (e.g. gusseter 406b) can be used to lift the second side 109 of the first package 404a and press the second side flush or squarely against the bottom surface of the seal jaws 408a,b at a second location 518. A cut line 516 can be used to separate the first end seal 101a of the second package 404b (e.g., left end seal 101a of FIG. 1a) and the second end seal 101b of the first package 404a. For example, a knife can be inserted at the cut line 516 between the seal jaws and the knife can be used to separate the first and second packages. For example, this can occur while the seal jaws are still engaged with the first and second package and the bottom gusseters press the first side of the second package against the seal jaws and the top gusseters press the second side of the first package against the seal jaws.

Eighth, as the package (and accordingly the upper transverse seal 101b) moves down the first machine (e.g. in direction 420), the seal jaw, top gusseters, bottom gusseters, and lifter remain engaged with a first and/or second package and travel down the first machine with the first and/or second package. These components remain engaged with the first and/or second package for a period of time while the second side 109 of a first package 404a and the first side 108 of a second package 404b are flattened to provide packages with a desired shape (e.g. flat first side 108 and flat second side 109). Although in some embodiments components of the first machine remain engaged with the first and/or second package and travel down the first machine, in other embodiments, the components of the first machine are stationary while they remain engaged with the first and/or second package. In other words, the first and/or second package can pause in the vicinity of the components so that the stationary components can engage the first and/or second package. Accordingly, in some embodiments, the first and/or second package are sealed and flattened while the first and/or second packages are moving with components of the first machine, while in other embodiments, the first and/or second package are sealed and flattened while the first and/or second package and components of the first machine are stationary.

Ninth, as shown in FIG. 5f, after sufficient time for sealing and setting the top and bottom of the package, the components disengage from the packages as appropriate to allow the first package to exit the first machine. The components of the first machine (e.g., the seal jaws, bottom gusseters, top gusseters, and tuckers) separate, move away from the package, and return to their respective open, home positions. For example, after the top gusseters 406a,b are in their home position, they rotate downwards (e.g., in directions 512a,b) so that they are in the same position and orientation that they had before they moved toward the package. An example of home position for the respective components can be seen in FIGS. 5a and 5g.

As the first package exits the first machine, it has the desired shape (e.g., the shape of a rectangular prism or cube) even without being processed by a second machine. It is useful to note that while the second package 404b will initially be provided with a flat first side 108, as the second package moves down (e.g., in direction 420) the first machine, the second package 404b will subsequently be in the position of the first package 404a and be provided with a flat second side 109. Accordingly, as the second package 404b exits the machine, the second package will also have the desired shape (e.g., rectangular prism or cube).

Although the steps for one embodiment of the invention have been described, in other embodiments the steps can occur at different times. For example, steps can occur simultaneously or sequentially. As another example, the order of steps can be varied as appropriate. For example, in some embodiments, the second, third and fourth steps occur simultaneously, but in other embodiments they occur sequentially. In some embodiments, the sixth and seventh steps occur simultaneously, but in other embodiments they occur at different times, or they start at different times even though they overlap.

In one embodiment, the invention comprises sealing the film to form a back seal; forming a first end seal to form a partially formed first package; flattening a first side of the first package to form a flat first side; filling the partially formed first package with product; forming a second end seal on the partially formed first package to form a first package from the partially formed first package; flattening the second side of the first package to form a flat second side, wherein the flattening the first side and the flattening the second side occur on a first machine. As can be seen in FIG. 4c, in some embodiments the flat first side and flat second side do not comprise folds and/or creases as can be formed when a package is simply folded over to form a side of the first package. Accordingly, some embodiments of this invention can make more efficient use of packaging film and provide a more aesthetically pleasing package than packages with first and/or second ends formed by merely folding the package film over on itself.

Figure 6:
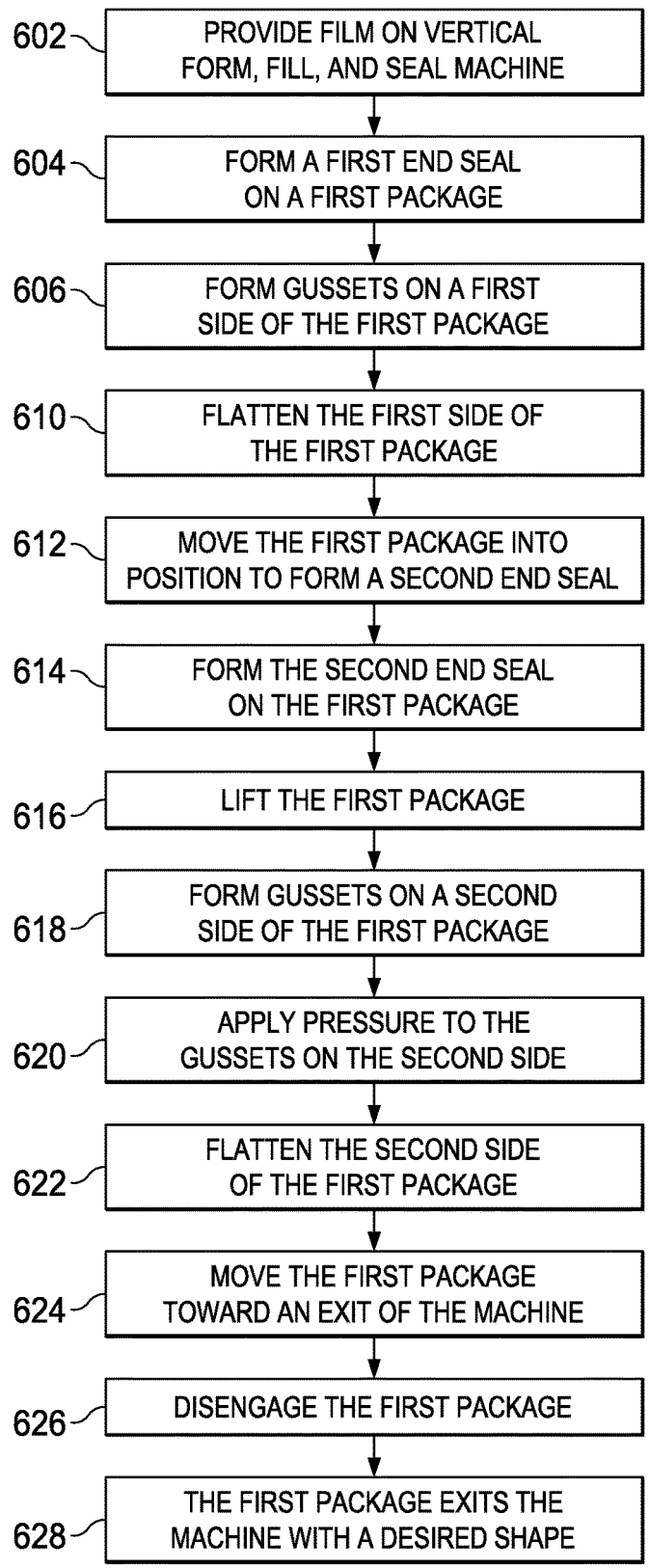
FIG. 6 depicts a flow chart of the manufacturing process in one embodiment in which a package has a desired shape when it exits a vertical form, fill, and seal machine.
Figure 7:
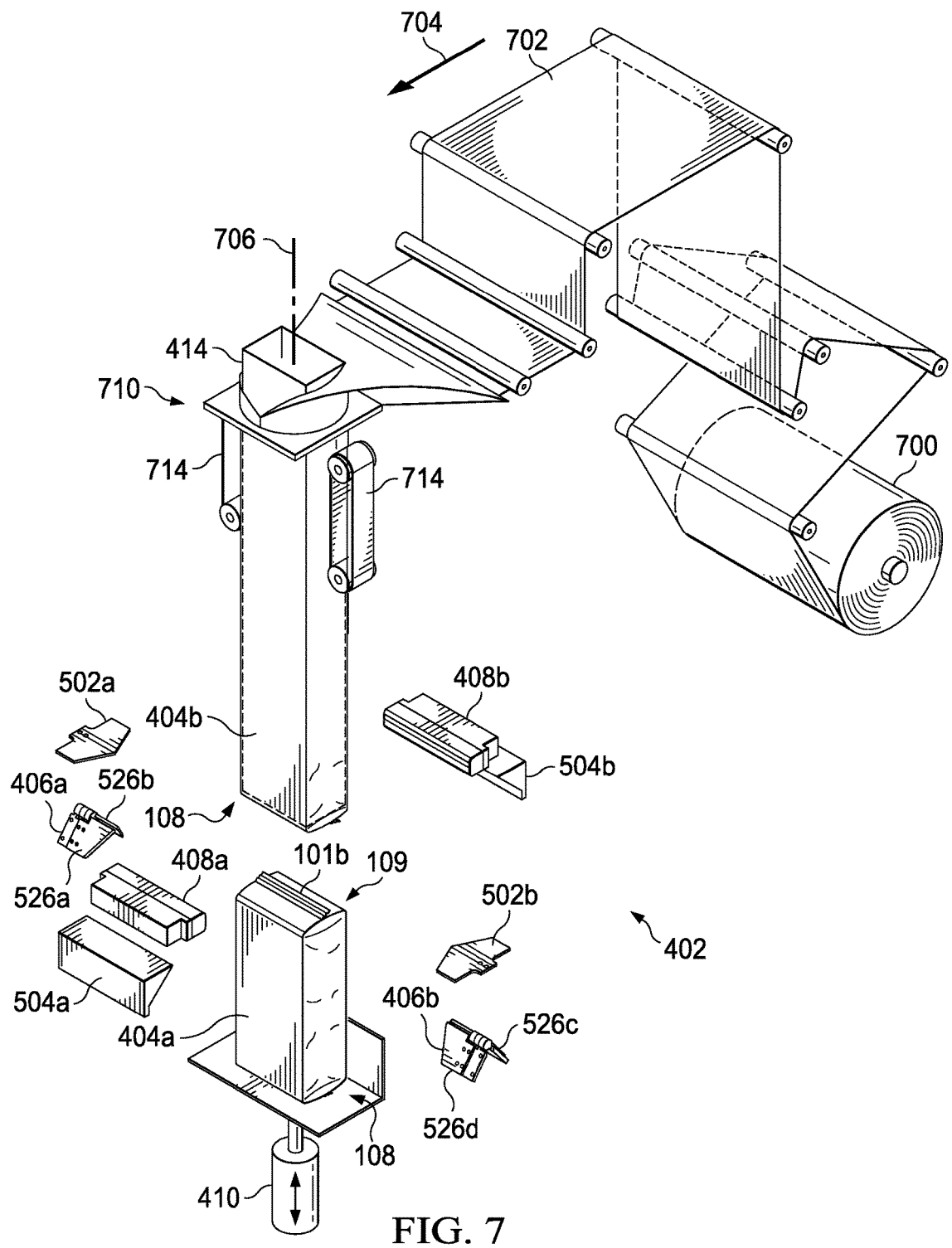
FIG. 7 is a schematic view of one embodiment of the invention depicting film being fed to the embodiment.

One embodiment of the invention will now be described with respect to FIG. 6. First, in a providing step 602, a film is provided on a vertical form, fill, and seal machine (e.g., the film can be wrapped around a fill tube of the machine).

Second, in a first sealing step 604, seal jaws move into contact with the film to form a first end seal on a first package.

Third, in a first-side gusseting step 606, bottom gusseters move into contact with the first package to form first and second gussets adjacent to the first side of the first package.

Fourth, in a first-side flattening step 610, the bottom gusseters press the first side of the first package against an exposed top surface of the seal jaws and thereby flatten the first side.

Fifth, in a first package-moving step 612, the first package moves along the vertical form, fill, and seal machine so that the first package is in position for forming a second end seal on the first package.

Sixth, in a second sealing step 614, seal jaws move into contact with the film to form the second end seal on the first package.

Seventh, in a lifting step 616, a lifter lifts the first package to relieve the weight of the first package on the package film.

Eighth, in a second-side gusseting step 618, top gusseters move into contact with the first package to form third and fourth gussets adjacent to a second side of the first package.

Ninth, in a pressure application step 620, tuckers move into contact with the first package to apply pressure to the third and fourth gussets of the first package.

Tenth, in a second-side flattening step 622, the top gusseters rotate to press the second side of the first package against the tuckers as the tuckers move away from the first package. When the tuckers are no longer between the top gusseters and the seal jaws, the top gusseters press the second side of the package against an exposed surface of the seal jaws.

Eleventh, in a second package-moving step 624, the first package moves along (e.g. down) the vertical form, fill, and seal machine toward an exit of the machine while the seal jaws, the lifter, and top gusseters remain engaged with the first package.

Twelfth, in a disengaging step 626, the seal jaws, lifter, and top gusseters disengage from the first package before the first package exits the vertical form, fill, and seal machine.

Thirteenth, in an exiting step 628, the first package exits the vertical form, fill, and seal machine with a desired shape (e.g., a rectangular prism, polygon, cube, etc.). For example, in some embodiments, the first end seal is on a first side of the package and the second end seal is on a second side of the first package. Additionally, in some embodiments, the first side and the second side of the first package are flattened before the package exits the vertical form, fill, and seal machine. Accordingly, in some embodiments, the first package exits the first machine with a flat first side and a flat second side.

In some embodiments, the seal jaws simultaneously make the second end seal of the first package and the first end seal of a second package. Accordingly, in some embodiments, the second sealing step for a first package and a first sealing step for a second package occur simultaneously. In some embodiments, the second-side gusseting step of a first package and a first-side gusseting step of a second package occur simultaneously. Additionally, in some embodiments, the following steps can occur simultaneously: the seal jaws move toward the second side of a first package and the first side of a second package, the lifter lifts the second package, the top gusseters move toward the second side of the first package, and the bottom gusseters move toward the first side of the second package.

In some embodiments, a first-side flattening step of a second package and the second-side flattening step of the first package occur simultaneously.

In some embodiments, during the second package-moving step, the first package moves along the vertical form, fill, and seal machine while the seal jaws remain engaged with the first package and the second package, the lifter remains engaged with the first package, the top gusseters remain engaged with the first package, and the bottom gusseters remain engaged with the second package. Accordingly, in some embodiments, both the first package and the second package move along the vertical form, fill, and seal machine during the second package-moving step. Likewise, in some embodiments, a first-package moving step for the second package occurs simultaneously with the second-package moving step for the first package.

In some embodiments, during the disengaging step, the seal jaws, the lifter, the top gusseters, and the bottom gusseters disengage from the first package and the second package before the first package exits the vertical form, fill, and seal machine.

In some embodiments of the invention, the second end seal of the first package is integral with a first end seal of a second package. In some embodiments, the second end seal of the first package and the first end seal of the second package are cut at a cut line to separate the first package from the second package. In some embodiments, the seal jaws comprise a cut line and a blade is inserted into the seal jaws to separate the first package from the second package.

In some embodiments, having a sufficient amount of air in the package helps to ensure that the package is provided with a flat right face 109. For example, the air can provide resistance so that as a flat surface is pushed against the right side of the package, the right side of the package is flattened rather than, for example, crumpling or wrinkling. Although the invention has been described with respect to making a flat right face, other faces can also be flat. For example, the left face or another face can be flat in addition to or in lieu of the right face.

In some embodiments, an external former can be used in lieu of, or in addition to, an internal former (e.g. fill tube of a vertical form, fill, and seal machine) to provide a package film with a desired shape.

In some embodiments stickers are used on a face of the package to provide additional rigidity, stability, strength, or to otherwise form or maintain the package in a desired shape.

In some embodiments, while the invention is described with a film being wrapped around a fill tube, in other embodiments the film can also be wrapped around different shaped structures (e.g., hollow structure, solid structure, rectangular prism, triangular prism, cylinder, etc.) although a hollow structure is useful if the structure will also serve to provide a conduit for filling the package with a product.

While the invention has been discussed using a package that is made in a particular orientation, the package can also be made in different orientations with appropriate modifications. For example, the first end seal can be the right end seal 101*b*, such that as a package 404 moves down a vertical form, fill, and seal machine, the right face 109 of the package is below the left face 108. In other words, in some embodiments the right end seal can be the first end seal to be formed by a vertical form, fill, and seal machine, but in other embodiment the left end seal can be the first end seal to be formed by the machine.

Another embodiment of the invention will now be described with reference to FIGS. 4*a*-4*c* and FIGS. 5*a*-5*h*. The embodiment comprises an apparatus for making a first package with a desired shape. As shown, the apparatus comprises seal jaws 408*a,b*, bottom gusseters 502*a,b*, top gusseters 406*a,b*, tuckers 504*a,b*, and a product conduit 414.

In some embodiments, the seal jaws move between an engaged position of the seal jaws (e.g. as shown in FIGS. 5*c*-5*e*, 5*h*) and a disengaged position of the seal jaws (e.g., home position shown in FIGS. 5*a*, 5*g*). In the engaged position of the seal jaws, the first package 404*a* is pressed between a first surface (e.g., first surface 418*a,b* in FIG. 5*a*) of each seal jaw to form an end seal (e.g. end seal 101*b* in FIG. 1*a*). In the disengaged position of the seal jaws, the seal jaws are separated and are not in contact with the first package. As shown, for example, in FIG. 5*a*, the seal jaws each comprise indentions on the first surface 418*a,b* of the seal jaws. As shown in FIG. 5*h*, the seal jaws comprise a cut line 516. The cut line comprises matching slits on each seal jaw and the slits are aligned to allow for the passage of a blade through the slits when seal jaws are closed to form an end seal.

In some embodiments, the bottom gusseters move among a first engaged position of the bottom gusseters, a second engaged position of the bottom gusseters, and a disengaged position of the bottom gusseters. In the first engaged position of the bottom gusseters, the bottom gusseters contact a first side of the first package to form gussets. An example of the bottom gusseters moving to the first engaged position is shown in FIG. 5*b*. In the second engaged position of the bottom gusseters, the bottom gusseters press the first side of the first package against the seal jaws. An example of the bottom gusseters in the second engaged position is shown in FIGS. 5*c*-5*e* and FIG. 5*h*. In the disengaged position of the bottom gusseters, the bottom gusseters do not contact the first package. An example of the disengaged position (e.g., home position) of the bottom gusseters is shown in FIGS. 5*a* and 5*g*. As shown, for example, in FIG. 5*a*, the bottom gusseters are flat and each bottom gusseter comprises a pointed end 520*a,b*. In the engaged position of the bottom gusseters, the pointed end contacts the first package to form a gusset.

In some embodiments, the top gusseters move among a first engaged position of the top gusseters, a second engaged position of the top gusseters, and a disengaged position of the top gusseters. In the first engaged position of the top gusseters, the top gusseters contact a second side of the first package to form gussets. An example of the top gusseters moving to the first engaged position is shown in FIGS. 4*b* and 5*b*. In the second engaged position of the top gusseters, the top gusseters press the second side of the first package against the seal jaws. An example of the top gusseters in the second engaged position is shown in FIGS. 5*e* and 5*h*. In the disengaged position of the top gusseters, the top gusseters do not contact the first package. An example of the disengaged position (e.g., home position) of the top gusseters is shown in FIGS. 5*a* and 5*g*. As shown in FIG. 5*a*, for example, the top gusseters each comprise a hinge 522*a,b* on an axis of rotation 524*a,b* and two portions 526*a,b,c,d* that are both fixed to the hinge. The two portions are rotatable along the axis of rotation to form both a folded configuration as shown, for example, in FIG. 5*a* and a flat configuration as shown, for example, in FIGS. 5*e* and 5*f*.

In some embodiments, the tuckers move between an engaged position of the tuckers and a disengaged position of the tuckers. In the engaged position of the tuckers, the tuckers contact the package. FIG. 5c shows an example of the tuckers moving into the engaged position. In the disengaged position, the tuckers do not contact the package. FIG. 5d shows an example of the tuckers moving out of an engaged position to a disengaged position. As shown, for example, in FIGS. 5a and 5h, each tucker comprises a tapered end 528a,b configured so that, when the top gusseters are in the folded configuration and pressing a second side of the first package against the tapered end of each of the tuckers (see, e.g., FIG. 5d), as the tuckers move away from each other the top gusseters can gradually unfold into the flat configuration (see, e.g., FIGS. 5d-5e) while the second side of the first package is under tension and the tension prevents wrinkles from forming on the second side of the first package. In some embodiments, the top gusseters move (e.g. partially retract) toward the disengaged position of the top gusseters prior to or during rotation of the top gusseters from the folded configuration to the unfolded configuration. Although the top gusseters move toward the disengaged position, they can stop and return to the first engaged position before the top gusseters lose contact with the first package. In some embodiments, after the top gusseters move toward the disengaged position of the top gusseters, the top gusseters return (e.g. extend) to the first engaged position of the gusseters again. In some embodiments, the top gusseters move toward the disengaged position of the top gusseters and then return to the first engaged position of the top gusseters prior to or during rotation of the top gusseters from the folded configuration to the unfolded configuration.

In some embodiments, the product conduit provides a conduit 414 for filling the first package with a product. For example, film to form a second package 404b and/or first package 404a is wrapped around the product conduit 414 (see, e.g., FIGS. 4b and 4c) when the first package 404a is filled and before the second end seal of the first package is formed. In some embodiments, film to form a second package 404b is wrapped around the product conduit 414 when the components of the package-making apparatus (e.g., seal jaws, top gusseters, tuckers) engage the second side of the first package 404a to form the second end seal of the first package. In some embodiment, the product conduit is a tube, a chute, a duct, or a pipe, or some other structure that serves to support the film as it is formed into a desired shape. In some embodiments, when the components of the apparatus are in an engaged position (e.g., seal jaws, bottom gusseters, top gusseters, tuckers), the components are positioned below the product conduit. In some embodiments, the product conduit is positioned above and adjacent to the bottom gusseters although the product conduit does not contact the bottom gusseters.

In some embodiments, when the bottom gusseters are in the second engaged position of the bottom gusseters, the bottom gusseters are adjacent to a first side 530a,b of the seal jaws, for example, as shown in FIG. 5h. In some embodiments, as shown in FIGS. 5e and 5h, the bottom gusseters are oriented such that a flat surface 532a,b with a sufficient surface area to flatten the first side 108 of the first package 404a is adjacent to the first side of the seal jaws 408a,b;

In some embodiments, as shown in FIG. 5h, when the seal jaws 408a,b are in the engaged position of the seal jaws, a second side 534a,b of the seal jaws, opposite the first side 530a,b, of the seal jaws, is adjacent to a first side 536a,b, of the top gusseters (see, e.g., FIGS. 5f and 5h).

In some embodiments, as shown, for example, in FIGS. 5e and 5h, when the top gusseters are in the second engaged position of the top gusseters, the top gusseters are in the flat configuration and a second side 538a,b of the top gusseters, opposite the first side 536a,b of the top gusseters, faces away from the seal jaws 408a,b. As shown, for example, in FIG. 5d, when the top gusseters 406a,b, engage the first package and the top gusseters are in the folded configuration, the first side 536a,b of the top gusseters presses the second side 109 of the first package 404a against the tapered end of the tuckers 504a,b.

One embodiment of the invention will now be described with reference to FIGS. 1a, 4a, 4c, 5a, 5f, 5h, 7 and 8. The embodiment is an improved vertical form, fill, and seal machine for making a first package 404a with a desired shape. In some embodiments, the components of the vertical form, fill, and seal machine are aligned along a vertical line 706. The vertical form, fill, and seal machine comprises a product conduit 414 (e.g., a former 414), a conveyor 714a,b (e.g., pull belts 714a,b), bottom gusseters 502a,b, and seal jaws 408a,b. The conveyor is positioned to contact a package film 702 that is wrapped around the product conduit. The conveyor moves the package film along the product conduit. In some embodiments, a sheet of film 702 is conveyed (e.g. in direction 704) to a forming mechanism 710 that wraps the sheet of film around the product conduit. In some embodiments, the sheet of film is fed from a film roller 700.

The seal jaws are positioned adjacent to opposite sides 105, 107 of the package film to form a first end seal 101a on the package film thereby forming a first side 108 of the first package when the seal jaws move together and the package film is pressed between the seal jaws. The bottom gusseters are positioned to form gussets 102a,c adjacent to the first end seal of the first package. The product conduit is positioned so that a product 422 passing through the product conduit will enter the first package after exiting the product conduit. The product conduit is positioned above the bottom gusseters. The bottom gusseters are positioned above the seal jaws. The bottom gusseters are adjacent to a first side 530a,b of the seal jaws.

When the term "above" is used herein to describe a location relative to an object, the term is not necessarily limited to locations that would be on a line that passes through the object and is parallel to the direction of gravitational acceleration. For example, the term "above" can be used to describe a location that is at a higher elevation than the object even if the location is to the left or right of the object.

As shown in FIGS. 1a, 4a, 5f, 5h, 7 and 8, the improvement to the vertical form, fill, and seal machine comprises top gusseters 406a,b and tuckers 504a,b. The first side 536a,b (e.g., top) of the top gusseters is positioned at about the same height as the top of the tuckers, wherein a first side 536a,b of the top gusseters is adjacent to a second side 534a,b of the seal jaws. The second side of the seal jaws is opposite the first side of the seal jaws. A second side 538a,b of the top gusseters is opposite the first side of the top gusseters, and the second side of the top gusseters faces away from the seal jaws when the top gusseters are in a second engaged position of the top gusseters. Additionally, in some embodiments when the top gusseters are in a second engaged position of the top gusseters, the top gusseters are adjacent to the tuckers.

In some embodiments, the improved vertical form, fill, and seal machine comprises a lifter 410. Although, some embodiments do not comprise a lifter. The lifter moves between an engaged position of the lifter and a disengaged position of the lifter. In the engaged position of the lifter, the lifter lifts the first package. In the disengaged position of the lifter, the lifter is not in contact with the first package.

In some embodiments, the apparatus comprises a plurality of conveyors 714a,b positioned to convey the package film along the product conduit at substantially the same speed along a perimeter 800 of the packaging film.

Figure 8:
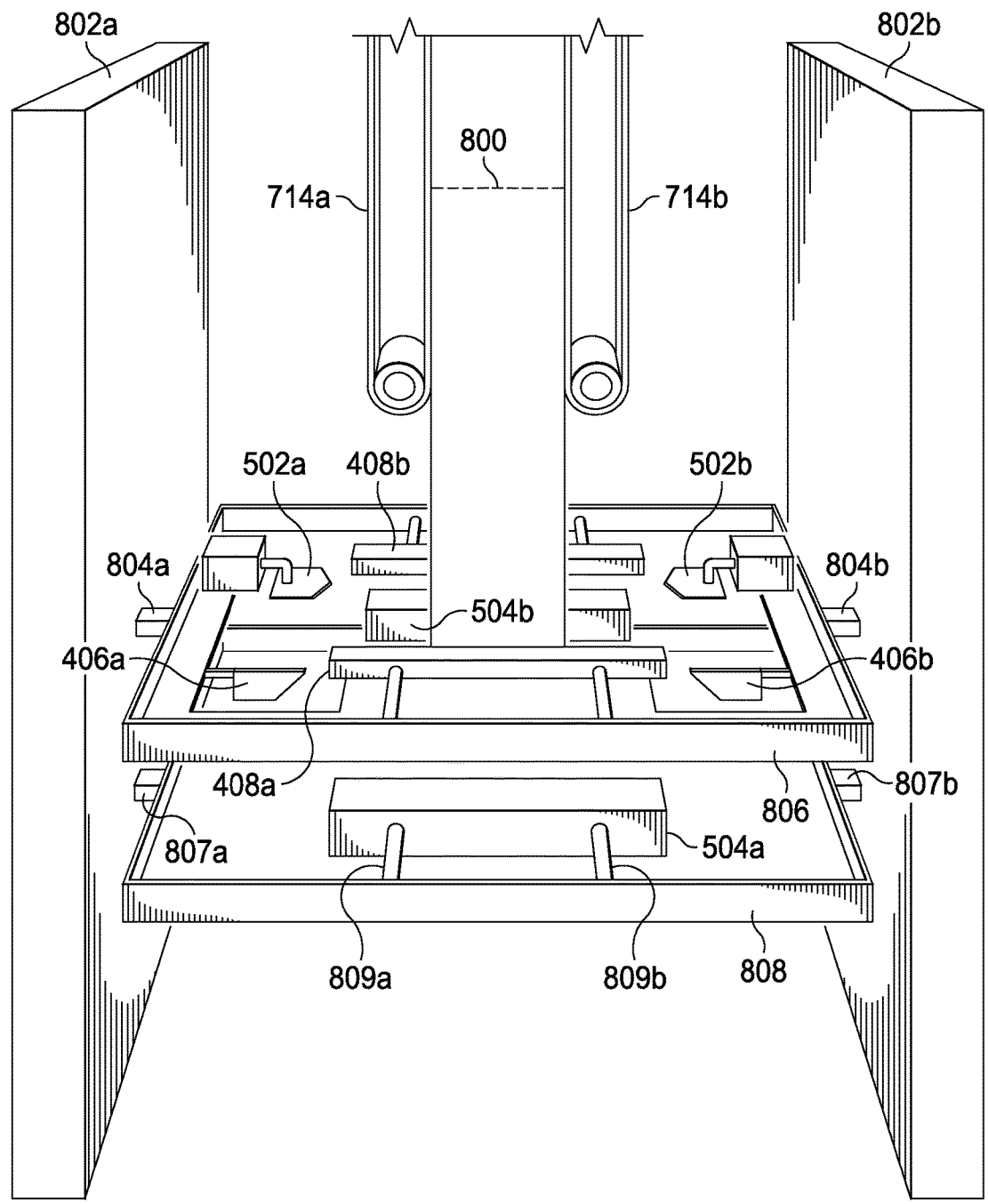
FIG. 8 is a schematic view of one embodiment of the invention depicting various components of the embodiment.
Figure 9A:
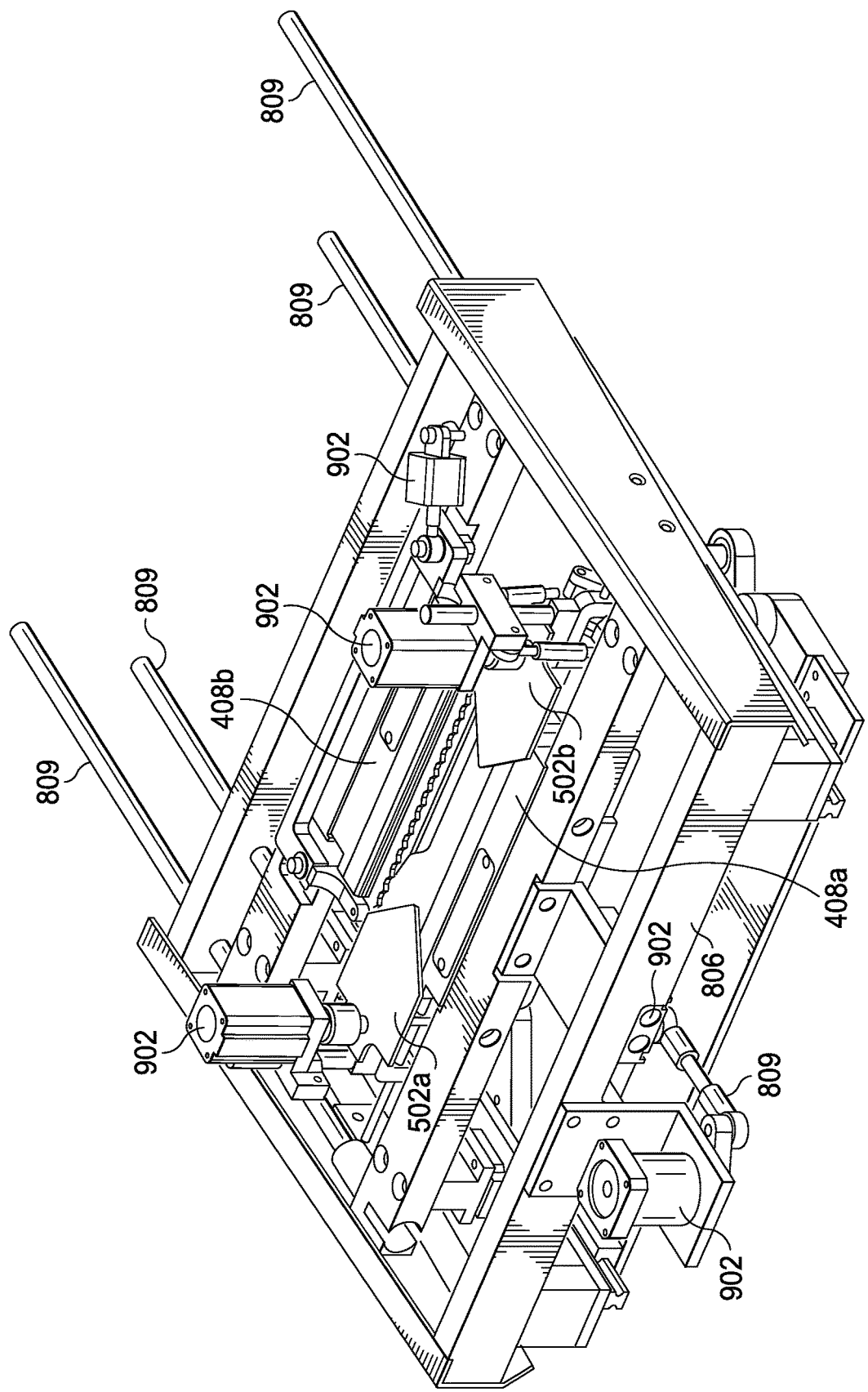
FIGS. 9a-9d show one embodiment of the invention from a top perspective view, a bottom perspective view, a top view, and a bottom view, respectively.
Figure 9B:
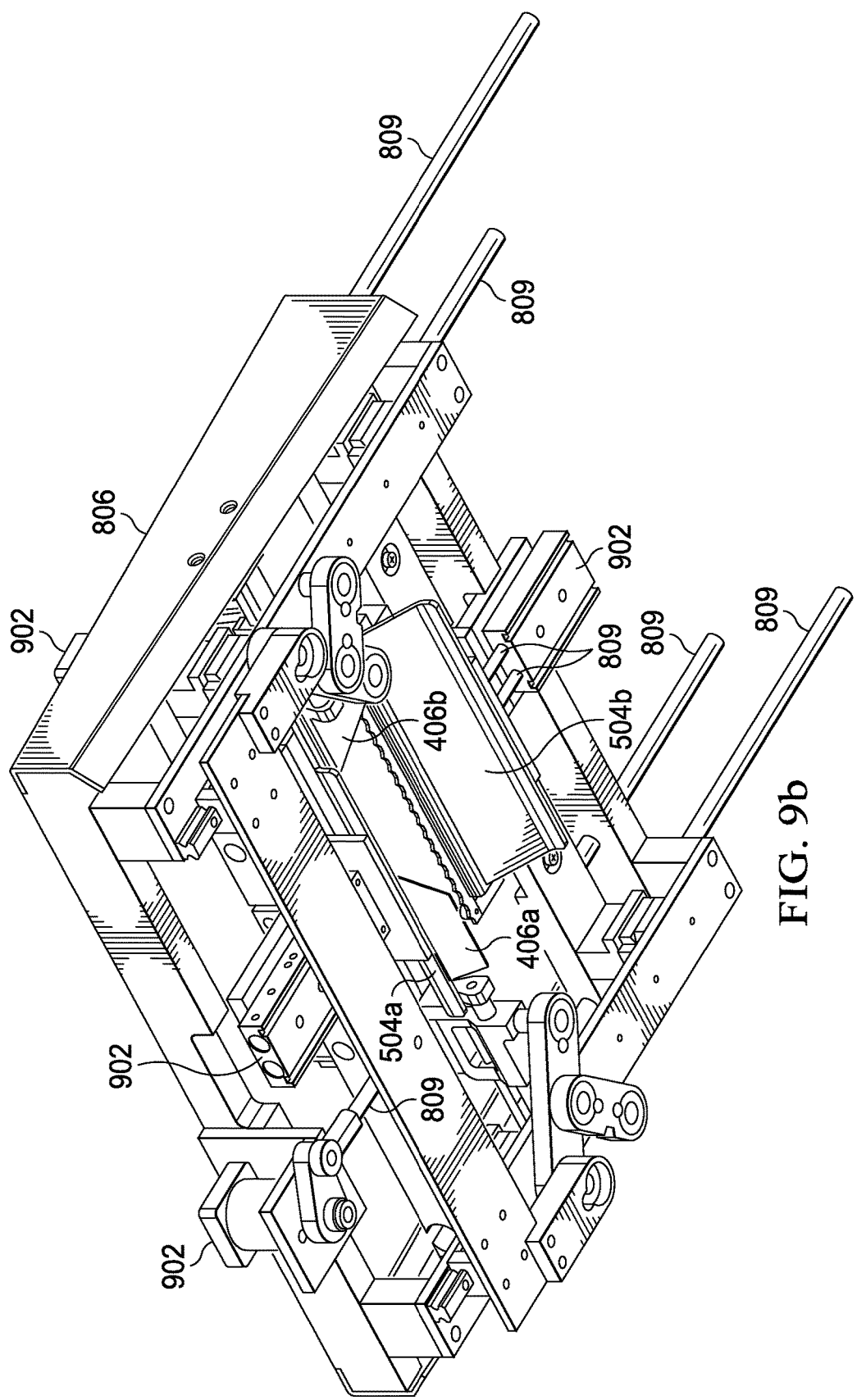
Figure 9C:
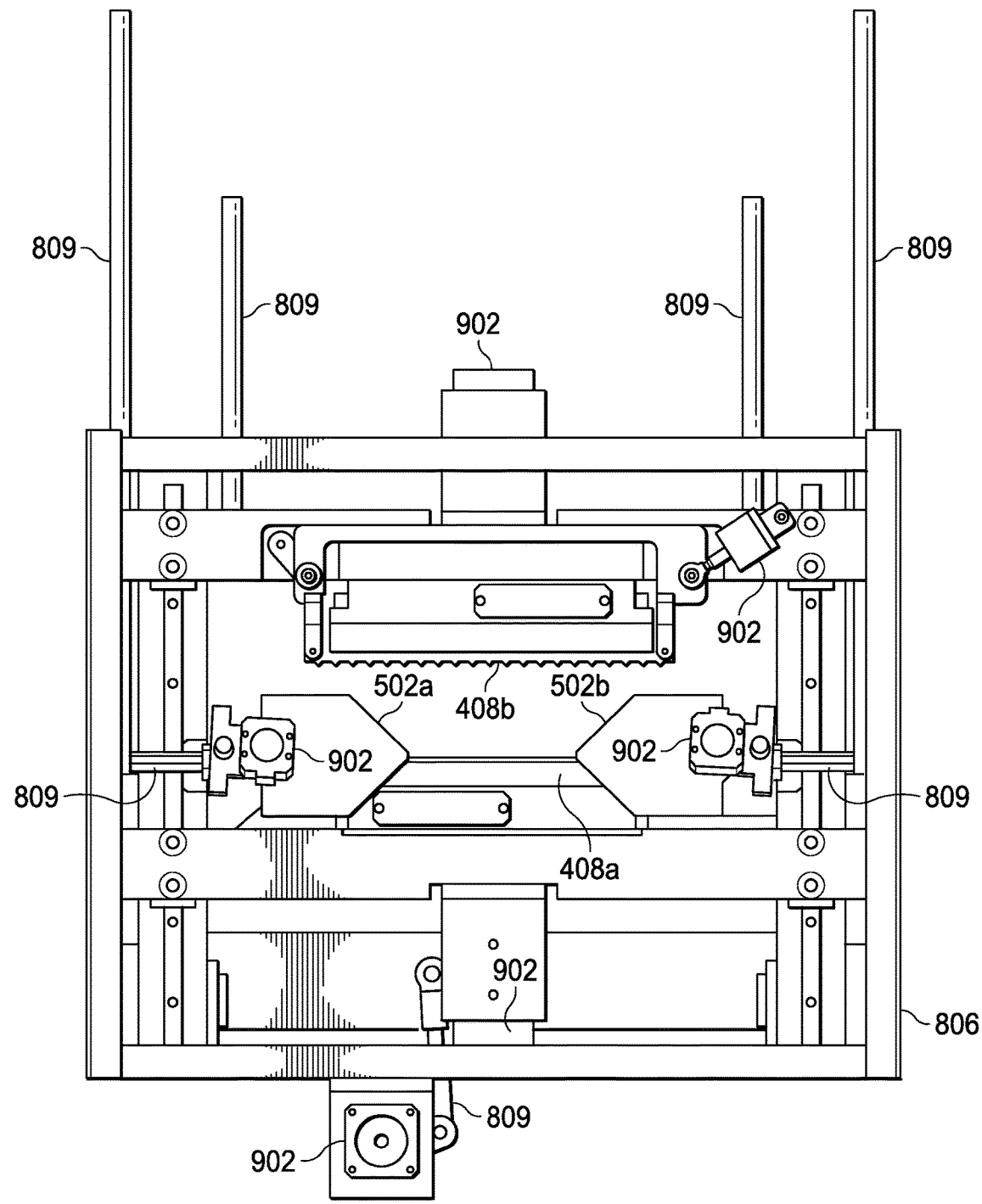
Figure 9D:
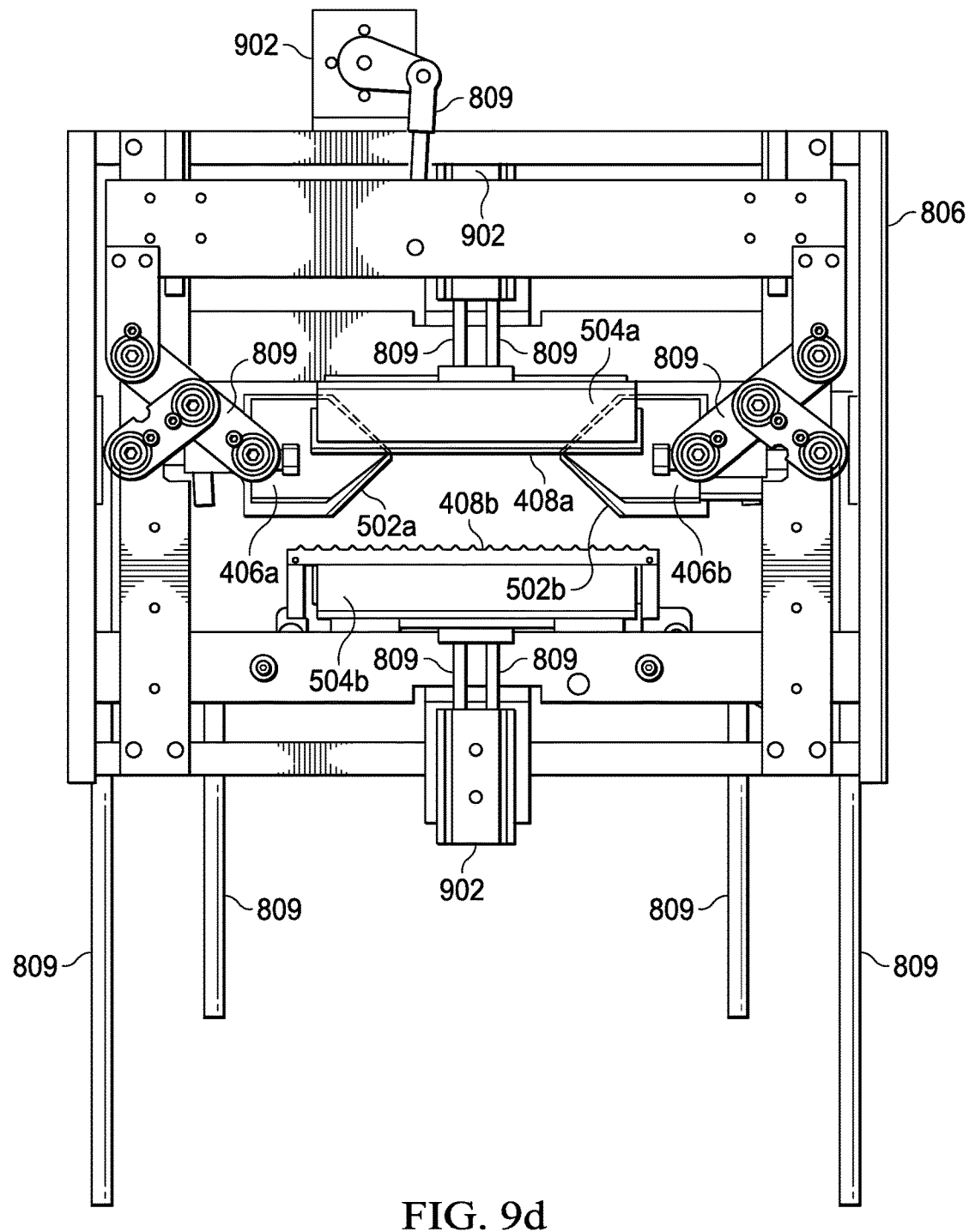

One embodiment of the invention will now be described with reference to FIG. 8. The embodiment is an apparatus that comprises a frame 802a,b that maintains the appropriate relative positions of the components of the apparatus. The frame can be a single structure or multiple structures. The frame can comprise a first set of supports 804a,b. The frame can comprise a first carriage 806. The first set of supports fix the first carriage to the frame. The first carriage supports a component (e.g., at least one component selected from the group consisting of seal jaws, bottom gusseters, top gusseters, tuckers, and any combination thereof) of the apparatus. The frame can comprise a second set of supports 807a,b. The frame can comprise a second carriage 808. The second set of supports fix the second carriage 808 to the frame. The second carriage supports a component (e.g., at least one component selected from the group consisting of seal jaws, bottom gusseters, top gusseters, tuckers, and any combination thereof) of the apparatus. A component (e.g., at least one component selected from the group consisting of seal jaws, bottom gusseters, top gusseters, tuckers, and any combination thereof) of the apparatus can be fixed to an arm (e.g., arms 809a,b). In some embodiments, the arms can be actuated to move the component that is fixed to the arm. Although pairs of various components (e.g., carriages, supports, arms) of the frame have been shown, in some embodiments, each component is used individually or as part of a plurality of each component.

On embodiment of the invention will now be described with reference to FIGS. 9a-9d. The embodiment comprises several components that have already been described (e.g., bottom gusseters 502a,b, seal jaws 408a,b, top gusseters 406a,b, and tuckers 504a,b). The embodiment also comprises a frame 806, arms 809 and actuators 902. The actuators can be used to actuate the arms and move the components of the embodiment (e.g., to or from an engaged position or disengaged position).

While this invention is particularly shown and described herein with reference to preferred embodiments, it will be understood by those skilled in the art that various changes in form and detail can be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the elements described herein, in all possible variations thereof, is encompassed by the invention unless otherwise indicated herein or otherwise clearly contradicted by context.

ADDITIONAL DISCLOSURE

The following clauses are offered as further description of the disclosed invention.
1. A package comprising:
   a front face;
   a back face;
   a top face and a bottom face connecting said front and back faces;
   a left side and a right side connecting said front and back faces, wherein said left and right sides are perpendicular to said front and back faces;
   wherein said left side and said right side each comprise a vertical end seal;
   a first upper hem seal located at the approximate intersection of said front face and said top face;
   a first lower hem seal located at the approximate intersection of the front face and the bottom face.
2. The package according to any preceding clause further comprising:
   a second upper hem seal located at the approximate intersection of the back face and the top face,
   a second lower hem seal located at the approximate intersection of the back face and the bottom face.
3. The package according to any preceding clause comprising a film.
4. The package according to clause 3 wherein said film has a thickness between about 2 and 4 mil.
5. The package according to any preceding clause wherein said front face comprises a re-sealable opening.
6. The package according to clause 5 wherein said re-sealable opening comprises score lines and a pull tab.
7. The package according to clause 2 wherein said first upper and said second upper hem seals are approximately parallel.
8. The package according to any preceding clause wherein said first upper hem seal and said first lower hem seal are approximately parallel.
9. The package according to any preceding clause wherein said front face comprises graphics, and wherein said graphics are oriented to be readable when said end seals are vertically oriented.
10. The package according to any preceding clause wherein said front face comprises graphics, and wherein said graphics are oriented perpendicular to said end seals.
11. The package according to any preceding clause wherein said back face comprises a back seal, wherein said back seal is perpendicular to said end seals.
12. A method for making a package, said method comprising the steps of:
   a. forming at least one hem seal on a film;
   b. sealing said film to form a back seal;
   c. forming a right end seal to form a partially formed package, wherein said right end seal is approximately perpendicular to said back seal;
   d. filling said partially formed package with product;
   e. forming a left end seal to form an intermediate package;
   f. conditioning said intermediate package;
   g. heating the film in the intermediate package;
   h. cooling the film to create a final package.
13. The method according to clause 12, wherein said final package comprises:
   a front face;
   a back face;
   a top face and a bottom face connecting said front and back faces;
   a left side and a right side connecting said front and back faces, wherein said left and right sides are perpendicular to said front and back faces;
   wherein said left side and said right side each comprise a vertical end seal;
   a first upper hem seal located at the approximate intersection of said front face and said top face,
   a first lower hem seal located at the approximate intersection of the front face and the bottom face.

14. The method according to clauses 12-13 wherein steps b-e take place on a vertical form, fill, and seal machine.

15. The method according to clause 14 wherein step a takes place prior to the film being introduced to a vertical form, fill, and seal machine.

16. The method according to clause 14 wherein steps f-h take place in a separate cubing mechanism.

17. The method according to clause 14 wherein steps f-h take place in a flighted conveyor.

18. The method according to clause 14 wherein said intermediate package created in step e) is transferred to a separate cubing mechanism.

19. The method according to clauses 12-18 wherein said conditioning comprises vibrating and rocking said intermediate package.

20. The method according to clauses 12-19 wherein said heating of step g) comprises utilizing a hot plate with a temperature of between 150° F. to about 250° F.

21. The method according to clauses 12-20 wherein said cooling of step h) comprises the transfer of heat from the film to a flighted conveyor through contact between the film and the flighted conveyor.

22. The method according to clauses 12-21 wherein said film has a thickness between about 2 and 4 mil.

23. The method according to clauses 12-22 wherein said final package comprises a re-sealable opening.

24. The method according to clause 23 wherein said re-sealable opening comprises score lines and a pull tab.

25. A apparatus for making a first package with a desired shape comprising:
   a product conduit;
   bottom gusseters;
   seal jaws;
   top gusseters;
   tuckers;
   wherein the product conduit is positioned above the bottom gusseters when the bottom gusseters are in a second engaged position of the bottom gusseters;
   wherein, when the bottom gusseters are in the second engaged position of the bottom gusseters, the bottom gusseters are adjacent to a first side of the seal jaws;
   wherein, when the seal jaws are in an engaged position of the seal jaws, a second side of the seal jaws, opposite the first side of the seal jaws, is adjacent to a first side of the top gusseters;
   wherein, when the top gusseters are in the second engaged position of the top gusseters, the top gusseters are adjacent to the tuckers.

26. The apparatus of clause 25:
   wherein the seal jaws move between the engaged position of the seal jaws and a disengaged position of the seal jaws;
   wherein, in the engaged position of the seal jaws, the first package is pressed between a first surface of each seal jaw to form an end seal; and
   wherein, in the disengaged position of the seal jaws, the seal jaws are separated.

27. The apparatus of clause 25:
   wherein the bottom gusseters move among a first engaged position of the bottom gusseters, the second engaged position of the bottom gusseters, and a disengaged position of the bottom gusseters;
   wherein, in the first engaged position of the bottom gusseters, the bottom gusseters contact a first side of the first package to form gussets;
   wherein, in the second engaged position of the bottom gusseters, the bottom gusseters press the first side of the first package against the seal jaws; and
   wherein, in the disengaged position of the bottom gusseters, the bottom gusseters do not contact the first package.

28. The apparatus of clause 25:
   wherein the top gusseters move among a first engaged position of the top gusseters, the second engaged position of the top gusseters, and a disengaged position of the top gusseters;
   wherein, in the first engaged position of the top gusseters, the top gusseters contact a second side of the first package to form gussets;
   wherein, in the second engaged position of the top gusseters, the top gusseters press the second side of the first package against the seal jaws; and
   wherein, in the disengaged position of the top gusseters, the top gusseters do not contact the first package.

29. The apparatus of clause 25:
   wherein the tuckers move between an engaged position of the tuckers and a disengaged position of the tuckers;
   wherein, in the engaged position of the tuckers, the tuckers contact the package; and
   wherein, in the disengaged position, the tuckers do not contact the package.

30. The apparatus of clause 25:
   wherein the product conduit provides a conduit for filling the first package with a product.

31. The apparatus of clause 25:
   wherein the seal jaws each comprise indentions on the first surface of the seal jaws.

32. The apparatus of clause 25:
   wherein the seal jaws comprise a cut line, wherein the cut line comprises matching slits on each seal jaw, and wherein, when the seal jaws are closed to form an end seal, the slits are aligned to allow for the passage of a blade through the slits.

33. The apparatus of clause 25:
   wherein the bottom gusseters have a flat surface for flattening a first end of the first package.

34. The apparatus of clause 25:
   wherein each bottom gusseter comprises a pointed end, and wherein, in the first engaged position of the bottom gusseters, the pointed end contacts the first package to form a gusset.

35. The apparatus of clause 25:
   wherein the top gusseters each comprise a hinge on an axis of rotation and two portions that are fixed to the hinge, wherein the two portions are rotatable along the axis of rotation to form both a folded configuration of the top gusseters and a flat configuration of the top gusseters.

36. The apparatus of clause 25:
   wherein each tucker comprises a tapered end.

37. The apparatus of clause 25:
   wherein a package film is wrapped around the product conduit.

38. The apparatus of clause 25:
   wherein the product conduit provides a conduit for filling the first package with a product.

39. The apparatus of clause 25:
   wherein the product conduit is selected from the group consisting of a tube, a chute, a duct, and a pipe.

40. The apparatus of clause 25:
   wherein, when the bottom gusseters are in the second engaged position of the bottom gusseters, the bottom gusseters are oriented such that a flat surface with a sufficient surface area to flatten the first side of the first package is adjacent to the first side of the seal jaws.

41. The apparatus of clause 25:
   wherein, when the top gusseters are in the second engaged position of the top gusseters, the top gusseters are in a flat configuration of the top gusseters.

42. The apparatus of clause 25:
   wherein, when the top gusseters engage the first package and the top gusseters are in a folded configuration, the first side of the top gusseters presses a second side of the first package against the tuckers.

43. A method for making a structurally resilient first package with a desired shape on a vertical form, fill, and seal machine, the method comprising the steps:
   b. sealing a film to form a back seal;
   c. forming a first end seal to form a partially formed first package, wherein the first end seal is approximately perpendicular to the back seal and wherein the first end seal is located on a first side of the partially formed first package;
   d. flattening the first side of the partially formed first package to form a flat first side;
   e. filling the partially formed first package with product;
   f. forming a second end seal on the partially formed first package to form a first package from the partially formed first package, wherein the second end seal is located on a second side of the first package;
   g. flattening the second side of the first package to form a flat second side, wherein flattening the second side comprises using top gusseters to press the second side of the first package near seal jaws, and wherein the flattening the first side and the flattening the second side occur on a first machine.

44. The method of clause 43 wherein the first machine is a vertical form, fill, and seal machine and the steps b-g take place on the first machine.

45. The method of clause 43 wherein the seal jaws move into contact with the film to form the first end seal on the first package.

46. The method of clause 43 wherein bottom gusseters move into contact with the first package to form gussets adjacent to the first side of the first package.

47. The method of clause 43 wherein bottom gusseters press the first side of the first package against seal jaws to flatten the first side of the first package.

48. The method of clause 43 wherein the seal jaws move into contact with the film to form the second end seal on the first package.

49. The method of clause 43 wherein a lifter lifts the first package while the top gusseters move into contact with the first package to form gussets adjacent to the second side of the first package.

50. The method of clause 49 wherein tuckers move into contact with the first package and apply pressure to the gussets adjacent to the second side of the first package.

51. The method of clause 50 wherein the top gusseters rotate to press the second side of the first package against the tuckers.

52. The method of clause 43 wherein the top gusseters rotate to press the second side of the first package against the seal jaws.

53. The method of clause 43 wherein the first package moves along the first machine while the seal jaws, a lifter, and the top gusseters are engaged with the first package.

54. The method of clause 53 wherein the seal jaws, the lifter, and the top gusseters disengage the first package before the first package exits the first machine.

55. The method of clause 43 wherein the film has a thickness between about 2 and 4 mil.

56. The method of clause 43 wherein the first package comprises a re-sealable opening.

57. The method of clause 56 wherein the re-sealable opening comprises score lines and a pull tab.

58. The method of clause 43 wherein the first machine is a vertical form, fill, and seal machine; and wherein the first package exits the vertical form, fill, and seal machine with a desired shape, said shape comprising the flat first side and the flat second side.

59. The method of clause 43 wherein the method further comprises the step:
   forming at least one hem seal on the film.

60. The method of clause 59 wherein step a takes place prior to the film being introduced to the first machine.

61. The method of clause 43, wherein the first package comprises:
   a front face;
   a back face;
   a top face and a bottom face connecting the front and back faces;
   a first side and a second side connecting the front and back faces, wherein the first and second sides are perpendicular to the front and back faces, and wherein the first side comprises the first end seal and the second side comprises the second end seal;
   a first upper hem seal located at the approximate intersection of the front face and the top face,
   a first lower hem seal located at the approximate intersection of the front face and the bottom face.

62. An apparatus comprising an improved vertical form, fill, and seal machine for making a first package with a desired shape, said vertical form, fill, and seal machine comprising a product conduit, a conveyor, bottom gusseters, and seal jaws; wherein the conveyor is positioned to contact a package film that is wrapped around the product conduit; wherein the conveyor moves the package film along the product conduit; wherein the seal jaws are positioned adjacent to opposite sides of the package film to form a first end seal on the package film thereby forming a first side of the first package and thereby forming the first end seal of the first package when the seal jaws move together and the package film is pressed between the seal jaws; wherein bottom gusseters are positioned to form gussets adjacent to the first end seal of the first package; wherein the product conduit is positioned so that a product passing through the product conduit will enter the first package after exiting the product conduit; wherein the product conduit is positioned above the bottom gusseters; wherein the bottom gusseters are positioned above the seal jaws; and wherein the bottom gusseters are adjacent to a first side of the seal jaws; wherein the improvement comprises:
   top gusseters;
   wherein the seal jaws are positioned above the top gusseters, wherein a first side of the top gusseters is adjacent to a second side of the seal jaws, wherein the second side of the seal jaws is opposite the first side of the seal jaws, and wherein a second side of the top gusseters is opposite the first side of the top gusseters.

63. The apparatus of clause 62:
   wherein the seal jaws move between an engaged position of the seal jaws and a disengaged position of the seal jaws;

wherein, in the engaged position of the seal jaws, the first package is pressed between a first surface of each seal jaw to form an end seal; and wherein, in the disengaged position of the seal jaws, the seal jaws do not contact the first package.

64. The apparatus of clause 62:

wherein the bottom gusseters move among a first engaged position of the bottom gusseters, a second engaged position of the bottom gusseters, and a disengaged position of the bottom gusseters;

wherein, in the first engaged position of the bottom gusseters, the bottom gusseters contact the first side of the first package to form gussets;

wherein, in the second engaged position of the bottom gusseters, the bottom gusseters press the first side of the first package against the seal jaws; and wherein, in the disengaged position of the bottom gusseters, the bottom gusseters do not contact the first package.

65. The apparatus of clause 62:

wherein the top gusseters move among a first engaged position of the top gusseters, a second engaged position of the top gusseters, and a disengaged position of the top gusseters;

wherein, in the first engaged position of the top gusseters, the top gusseters contact a second side of the first package to form gussets;

wherein, in the second engaged position of the top gusseters, the top gusseters press the second side of the first package against the seal jaws; and wherein, in the disengaged position of the top gusseters, the top gusseters do not contact the first package.

66. The apparatus of clause 62:

further comprising tuckers;

wherein the top gusseters are positioned adjacent to the tuckers wherein the tuckers move between an engaged position of the tuckers and a disengaged position of the tuckers;

wherein, in the engaged position of the tuckers, the tuckers contact the package; and wherein, in the disengaged position, the tuckers do not contact the package.

67. The apparatus of clause 62:

further comprising a lifter;

wherein the lifter moves between an engaged position of the lifter and a disengaged position of the lifter;

wherein, in the engaged position of the lifter, the lifter lifts the first package;

wherein, in the disengaged position of the lifter, the lifter is not in contact with the first package.

68. The apparatus of clause 63:

wherein the seal jaws each comprise indentions on the first surface of the seal jaws.

69. The apparatus of clause 62:

wherein the seal jaws comprise a cut line, wherein the cut line comprises matching slits on each seal jaw, and wherein, when the seal jaws are closed to form an end seal, the slits are aligned to allow a blade to pass through the slits.

70. The apparatus of clause 62:

wherein the bottom gusseters have a flat surface for flattening the first end of the first package.

71. The apparatus of clause 64:

wherein each bottom gusseter comprises a pointed end, and wherein, in the first engaged position of the bottom gusseters, the pointed end contacts the first package to form a gusset.

72. The apparatus of clause 62:

wherein the top gusseters each comprise a hinge on an axis of rotation and two portions that are fixed to the hinge, wherein the two portions are rotatable along the axis of rotation to form both a folded configuration of the top gusseters and a flat configuration of the top gusseters.

73. The apparatus of clause 66:

wherein each tucker comprises a tapered end.

74. The apparatus of clause 62:

wherein a package film is wrapped around the product conduit.

75. The apparatus of clause 62:

wherein the apparatus comprises a plurality of conveyors positioned to convey the package film along the product conduit at substantially a single speed along a perimeter of the packaging film.

76. The apparatus of clause 62:

wherein the product conduit is selected from the group consisting of a tube, a chute, a duct, and a pipe.

77. The apparatus of clause 64:

wherein, when the bottom gusseters are in the second engaged position of the bottom gusseters, the bottom gusseters are oriented such that a flat surface with a sufficient surface area to flatten the first side of the first package is adjacent to the first side of the seal jaws.

78. The apparatus of clause 65:

wherein, when the top gusseters are in the second engaged position of the top gusseters, the top gusseters are in a flat configuration of the top gusseters.

79. The apparatus of clause 62:

wherein, when the top gusseters engage the first package and the top gusseters are in a folded configuration, the first side of the top gusseters presses a second side of the first package against the tuckers.

80. The method of clause 43:

wherein flattening the second side comprises using top gusseters to press the second side of the first package against the seal jaws.

81. The method of clause 43 wherein bottom gusseters press the first side of the first package near seal jaws to flatten the first side of the first package.

82. The apparatus of clause 62:

wherein the bottom gusseters move among a first engaged position of the bottom gusseters, a second engaged position of the bottom gusseters, and a disengaged position of the bottom gusseters;

wherein, in the first engaged position of the bottom gusseters, the bottom gusseters contact the first side of the first package to form gussets;

wherein, in the second engaged position of the bottom gusseters, the bottom gusseters press the first side of the first package near the seal jaws; and wherein, in the disengaged position of the bottom gusseters, the bottom gusseters do not contact the first package.

83. The apparatus of clause 62:

wherein the top gusseters move among a first engaged position of the top gusseters, a second engaged position of the top gusseters, and a disengaged position of the top gusseters;

wherein, in the first engaged position of the top gusseters, the top gusseters contact a second side of the first package to form gussets;

wherein, in the second engaged position of the top gusseters, the top gusseters press the second side of the first package near the seal jaws; and wherein, in the disengaged position of the top gusseters, the top gusseters do not contact the first package.

What is claimed:

1. A method for making a structurally resilient first package with a desired shape on a vertical form, fill, and seal machine, the method comprising the steps:
  b. sealing a film to form a back seal;
  c. forming a first end seal to form a partially formed first package, wherein the first end seal is approximately perpendicular to the back seal and wherein the first end seal is located on a first side of the partially formed first package;
  d. flattening the first side of the partially formed first package to form a flat first side;
  e. filling the partially formed first package with product;
  f. forming a second end seal on the partially formed first package to form a first package from the partially formed first package, wherein the second end seal is located on a second side of the first package;
  g. flattening the second side of the first package to form a flat second side, wherein flattening the second side comprises using top gusseters to press the second side of the first package near seal jaws, wherein the flattening the first side and the flattening the second side occur on a first machine; wherein the first machine comprises the top gusseters and tuckers; wherein the tuckers are configured to move between an engaged position of the tuckers and a disengaged position of the tuckers; wherein, in the engaged position of the tuckers, the tuckers contact the first package and are adjacent to the top gusseters; wherein in the disengaged position, the tuckers do not contact the first package; wherein the top gusseters each comprise two portions rotatable along an axis of rotation to form a folded configuration and a flat configuration; and wherein, when the top gusseters engage the first package and the top gusseters are in the folded configuration, a first side of the top gusseters presses the second side of the first package against the tuckers.

2. The method of claim 1 wherein the first machine is a vertical form, fill, and seal machine and the steps b-g take place on the first machine.

3. The method of claim 1 wherein the seal jaws move into contact with the film to form the first end seal on the first package.

4. The method of claim 1 wherein bottom gusseters move into contact with the first package to form gussets adjacent to the first side of the first package.

5. The method of claim 1 wherein bottom gusseters press the first side of the first package against seal jaws to flatten the first side of the first package.

6. The method of claim 1 wherein the seal jaws move into contact with the film to form the second end seal on the first package.

7. The method of claim 1 wherein a lifter lifts the first package while the top gusseters move into contact with the first package to form gussets adjacent to the second side of the first package.

8. The method of claim 7 wherein the tuckers move into contact with the first package and apply pressure to the gussets adjacent to the second side of the first package.

9. The method of claim 8 wherein the two portions of each of the top gusseters rotate to press the second side of the first package against the tuckers.

10. The method of claim 1 wherein the two portions of each of the top gusseters rotate to press the second side of the first package against the seal jaws.

11. The method of claim 1 wherein the first package moves along the first machine while the seal jaws, a lifter, and the top gusseters are engaged with the first package.

12. The method of claim 11 wherein the seal jaws, the lifter, and the top gusseters disengage the first package before the first package exits the first machine.

13. The method of claim 1 wherein the film has a thickness between 2 and 4 mil.

14. The method of claim 1 wherein the first package comprises a re-sealable opening.

15. The method of claim 14 wherein the re-sealable opening comprises score lines and a pull tab.

16. The method of claim 1 wherein the first machine is a vertical form, fill, and seal machine; and wherein the first package exits the vertical form, fill, and seal machine with a desired shape, said shape comprising the flat first side and the flat second side.

17. The method of claim 1 wherein the method further comprises the step:
  a. forming at least one hem seal on the film.

18. The method of claim 17 wherein step a takes place prior to the film being introduced to the first machine.

19. The method of claim 1, wherein the first package comprises:
  a front face;
  a back face;
  a top face and a bottom face connecting the front and back faces;
  a first side and a second side connecting the front and back faces, wherein the first and second sides are perpendicular to the front and back faces, and wherein the first side comprises the first end seal, and the second side comprises the second end seal;
  a first upper hem seal located at the approximate intersection of the front face and the top face;
  a first lower hem seal located at the approximate intersection of the front face and the bottom face.

20. An apparatus comprising an improved vertical form, fill, and seal machine for making a first package with a desired shape, said vertical form, fill, and seal machine comprising a product conduit, a conveyor, bottom gusseters, and seal jaws; wherein the conveyor is positioned to contact a package film that is wrapped around the product conduit; wherein the conveyor moves the package film along the product conduit; wherein the seal jaws are positioned adjacent to opposite sides of the package film to form a first end seal on the package film thereby forming a first side of the first package and thereby forming the first end seal of the first package when the seal jaws move together and the package film is pressed between the seal jaws; wherein the bottom gusseters are positioned to form gussets adjacent to the first end seal of the first package; wherein the product conduit is positioned so that a product passing through the product conduit will enter the first package after exiting the product conduit; wherein the product conduit is positioned above the bottom gusseters; wherein the bottom gusseters are positioned above the seal jaws; and wherein the bottom gusseters are adjacent to a first side of the seal jaws; wherein the improvement comprises:
  tuckers and top gusseters;
  wherein the tuckers are configured to move between an engaged position of the tuckers and a disengaged position of the tuckers;
  wherein, in the engaged position of the tuckers, the tuckers contact the first package and are adjacent to the top gusseters; and wherein in the disengaged position, the tuckers do not contact the first package;

wherein the top gusseters each comprise two portions rotatable along an axis of rotation to form a folded configuration and a flat configuration of the top gusseters;

wherein, when the top gusseters engage the first package and the top gusseters are in the folded configuration, a first side of the top gusseters presses a second side of the first package against the tuckers;

wherein the seal jaws are positioned above the top gusseters, wherein the first side of the top gusseters is adjacent to a second side of the seal jaws, wherein the second side of the seal jaws is opposite the first side of the seal jaws, and wherein a second side of the top gusseters is opposite the first side of the top gusseters.

21. The apparatus of claim 20:
wherein the seal jaws move between an engaged position of the seal jaws and a disengaged position of the seal jaws;
wherein, in the engaged position of the seal jaws, the first package is pressed between a first surface of each seal jaw to form an end seal; and
wherein, in the disengaged position of the seal jaws, the seal jaws do not contact the first package.

22. The apparatus of claim 21:
wherein the first surface of each of the seal jaws comprises indentions.

23. The apparatus of claim 20:
wherein the bottom gusseters move among a first engaged position of the bottom gusseters, a second engaged position of the bottom gusseters, and a disengaged position of the bottom gusseters;
wherein, in the first engaged position of the bottom gusseters, the bottom gusseters contact the first side of the first package to form gussets;
wherein, in the second engaged position of the bottom gusseters, the bottom gusseters press the first side of the first package against the seal jaws; and
wherein, in the disengaged position of the bottom gusseters, the bottom gusseters do not contact the first package.

24. The apparatus of claim 23:
wherein each bottom gusseter comprises a pointed end, and wherein, in the first engaged position of the bottom gusseters, each pointed end contacts the first package to form a gusset.

25. The apparatus of claim 23:
wherein, when the bottom gusseters are in the second engaged position of the bottom gusseters, the bottom gusseters are oriented such that a flat surface of the bottom gusseters is adjacent to the first side of the seal jaws, wherein the flat surface of the bottom gusseters comprises a sufficient surface area to flatten the first side of the first package.

26. The apparatus of claim 20:
wherein the top gusseters move among a first engaged position of the top gusseters, a second engaged position of the top gusseters, and a disengaged position of the top gusseters;
wherein, in the first engaged position of the top gusseters, the top gusseters contact the second side of the first package to form gussets; and
wherein, in the second engaged position of the top gusseters, the top gusseters press the second side of the first package against the seal jaws; and
wherein, in the disengaged position of the top gusseters, the top gusseters do not contact the first package.

27. The apparatus of claim 26:
wherein, when the top gusseters are in the second engaged position of the top gusseters, the top gusseters are in the flat configuration of the top gusseters.

28. The apparatus of claim 20:
further comprising a lifter;
wherein the lifter moves between an engaged position of the lifter and a disengaged position of the lifter;
wherein, in the engaged position of the lifter, the lifter lifts the first package;
wherein, in the disengaged position of the lifter, the lifter is not in contact with the first package.

29. The apparatus of claim 20:
wherein the seal jaws comprise a cut line, wherein the cut line comprises matching slits on each seal jaw, and wherein, when the seal jaws are closed to form an end seal, the slits are aligned to allow a blade to pass through the slits.

30. The apparatus of claim 20:
wherein the bottom gusseters have a flat surface for flattening the first side of the first package.

31. The apparatus of claim 20:
wherein each of the top gusseters comprises a respective hinge on the respective axis of rotation, wherein the respective two portions of each of the top gusseters are fixed to the respective hinge of each of the top gusseters, and wherein the respective two portions are rotatable along the respective axis of rotation to form both the folded configuration of the top gusseters and the flat configuration of the top gusseters.

32. The apparatus of claim 20:
wherein each tucker comprises a tapered end.

33. The apparatus of claim 20:
wherein a package film is wrapped around the product conduit.

34. The apparatus of claim 20:
wherein the apparatus comprises a plurality of conveyors positioned to convey the package film along the product conduit at substantially a single speed along a perimeter of the packaging film.

35. The apparatus of claim 20:
wherein the product conduit is selected from the group consisting of a tube, a chute, a duct, and a pipe.

* * * * *